(12) United States Patent
Cherian et al.

(10) Patent No.: US 9,160,779 B2
(45) Date of Patent: Oct. 13, 2015

(54) DYNAMIC ADAPTIVE STREAMING PROXY FOR UNICAST OR BROADCAST/MULTICAST SERVICES

(75) Inventors: George Cherian, San Diego, CA (US); Gordon Kent Walker, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/536,870

(22) Filed: Jun. 28, 2012

(65) Prior Publication Data

US 2013/0007814 A1 Jan. 3, 2013

Related U.S. Application Data

(60) Provisional application No. 61/503,601, filed on Jun. 30, 2011.

(51) Int. Cl.
*H04N 7/20* (2006.01)
*H04L 29/06* (2006.01)

(52) U.S. Cl.
CPC .......... *H04L 65/605* (2013.01); *H04L 65/4076* (2013.01); *H04L 65/4084* (2013.01); *H04L 65/80* (2013.01)

(58) Field of Classification Search
CPC .................... H04N 21/41407; H04N 21/6131; H04N 5/4401
USPC .............................. 725/105–118, 62, 105–18; 709/217–232; 455/518, 519, 3.01
See application file for complete search history.

(56) References Cited

U.S. PATENT DOCUMENTS

| | | | |
|---|---|---|---|
| 6,938,170 B1 * | 8/2005 | Kraft et al. ...................... | 726/23 |
| 7,028,096 B1 * | 4/2006 | Lee ................. | 709/231 |
| 7,117,504 B2 * | 10/2006 | Smith et al. .................... | 719/328 |
| 7,546,602 B2 * | 6/2009 | Hejlsberg et al. ............. | 719/313 |

(Continued)

FOREIGN PATENT DOCUMENTS

| | | |
|---|---|---|
| JP | 2009177528 A | 8/2009 |
| JP | 2010124269 A | 6/2010 |
| WO | 2011054377 A1 | 5/2011 |

OTHER PUBLICATIONS

Klopfenstein, L., et al., Multicast TV Channels over Wireless Neutral Access Networks: Proof of Concept and Implementation, International Journal on Advances in Telecommunications, 2011, pp. 93-101, vol. 4 No. 1 & 2, Retrieved from the Internet at: http://www.thinkmind.org/download.php?articleid=tele_v4.n12_2-11_9.

(Continued)

*Primary Examiner* — Annan Shang
(74) *Attorney, Agent, or Firm* — Novak Druce Connolly Bove + Quigg LLP

(57) ABSTRACT

Techniques are provided for a dynamic adaptive streaming proxy for unicast or broadcast/multicast service. For example, a method for controlling an encoding format of multimedia content for a multimedia client of a wireless communications network (WCN) includes modifying, at a proxy component of the WCN network entity, a data structure that associates one or more different locators for multimedia content with respective different encoding formats for the multimedia content, to obtain a modified data structure. The method may include controlling an encoding format for the multimedia content provided to at least one multimedia client, at least in part by the modified data structure.

57 Claims, 20 Drawing Sheets

(56) References Cited

U.S. PATENT DOCUMENTS

| | | | |
|---|---|---|---|
| 7,548,962 B2* | 6/2009 | Weber et al. | 709/219 |
| 7,738,833 B2* | 6/2010 | Bettis et al. | 455/3.04 |
| 8,046,494 B2* | 10/2011 | Levenberg | 709/246 |
| 8,077,717 B2 | 12/2011 | Yan et al. | |
| 8,099,089 B2* | 1/2012 | Sedlacek et al. | 455/416 |
| 8,219,134 B2* | 7/2012 | Maharajh et al. | 455/519 |
| 8,229,480 B2* | 7/2012 | Bantukul | 455/466 |
| 8,260,250 B2* | 9/2012 | Busin et al. | 455/404.2 |
| 8,270,344 B2* | 9/2012 | Ku et al. | 370/328 |
| 8,843,124 B2* | 9/2014 | Fan et al. | 455/419 |
| 2004/0151315 A1* | 8/2004 | Kim | 380/241 |
| 2007/0220573 A1 | 9/2007 | Chiussi et al. | |
| 2008/0120129 A1* | 5/2008 | Seubert et al. | 705/1 |
| 2008/0192711 A1* | 8/2008 | Balachandran et al. | 370/338 |
| 2008/0207137 A1 | 8/2008 | Maharajh et al. | |
| 2009/0006643 A1 | 1/2009 | Lee | |
| 2010/0106798 A1 | 4/2010 | Barreto et al. | |
| 2011/0145430 A1 | 6/2011 | Ha et al. | |
| 2012/0192230 A1* | 7/2012 | Algie et al. | 725/38 |
| 2012/0263089 A1 | 10/2012 | Gupta et al. | |
| 2013/0182643 A1 | 7/2013 | Pazos et al. | |
| 2013/0294321 A1 | 11/2013 | Wang et al. | |
| 2014/0201323 A1 | 7/2014 | Fall et al. | |
| 2014/0372624 A1 | 12/2014 | Wang et al. | |
| 2015/0012584 A1 | 1/2015 | Lo et al. | |

OTHER PUBLICATIONS

International Search Report and Written Opinion—PCT/US2012/045079—ISA/EPO—Oct. 10, 2010.

* cited by examiner

DYNAMIC ADAPTIVE STREAMING PROXY FOR UNICAST OR BROADCAST/MULTICAST SERVICES

CROSS-REFERENCE TO RELATED APPLICATION

The present application for patent claims priority to Provisional Application No. 61/503,601, filed Jun. 30, 2011, entitled "DYNAMIC ADAPTIVE STREAMING PROXY FOR UNICAST OR BROADCAST/MULTICAST SERVICES", which is assigned to the assignee hereof, and is hereby expressly incorporated in its entirety by reference herein.

FIELD

Aspects of the present disclosure relate generally to wireless communication systems, and more particularly, to a dynamic adaptive streaming proxy for unicast or broadcast/multicast services.

BACKGROUND

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs), also referred to as mobile devices or mobile entities. A UE may communicate with a base station via a downlink and an uplink. The downlink (or forward link) refers to the communication link from the base station to the UE, and the uplink (or reverse link) refers to the communication link from the UE to the base station. As used herein, a "base station" means an eNode B (eNB), a Node B, a Home Node B, or similar network component of a wireless communications system.

The 3rd Generation Partnership Project (3GPP) Long Term Evolution (LTE) represents a major advance in cellular technology as an evolution of Global System for Mobile communications (GSM) and Universal Mobile Telecommunications System (UMTS). The LTE physical layer (PHY) provides a highly efficient way to convey both data and control information between base stations, such as an evolved Node Bs (eNBs), and mobile devices, such as UEs. In prior applications, a method for facilitating high bandwidth communication for multimedia has been single frequency network (SFN) operation. SFNs utilize radio transmitters, such as, for example, eNBs, to communicate with subscriber UEs. In unicast operation, each eNB is controlled so as to transmit signals carrying information directed to one or more particular subscriber UEs. The specificity of unicast signaling enables person-to-person services such as, for example, voice calling, text messaging, or video calling.

In broadcast operation, several eNBs in a broadcast area broadcast signals in a synchronized fashion, carrying information that can be received and accessed by any subscriber UE in the broadcast area. The generality of broadcast operation enables greater efficiency in transmitting information of general public interest, for example, multimedia broadcasts and multimedia unicast services providing various types of audio-video content to the end user. As the demand and system capability for multimedia content has increased, system operators are in need of tools to control use of radio resources for multimedia content, in a flexible and adaptive fashion.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Disclosed is an apparatus and method for controlling an encoding format of multimedia content for a multimedia client of a wireless communications network (WCN). According to one aspect, a method for controlling an encoding format of multimedia content for a multimedia client of a wireless communications network includes modifying, at a proxy component of a WCN network entity, a data structure that associates one or more different locators for multimedia content with respective different encoding formats for the multimedia content, to obtain a modified data structure; and controlling an encoding format for the multimedia content provided to at least one multimedia client, at least in part by the modified data structure.

According to another aspect, a system for controlling an encoding format of multimedia content provided to a multimedia client of a wireless communications network (WCN) includes means for modifying, at a proxy component of a WCN network entity, a data structure received from a content server that associates different locators for multimedia content with respective different encoding formats for the multimedia content, to obtain a modified data structure, thereby controlling an encoding format for the multimedia content provided to at least one multimedia client.

According to another aspect, a system for controlling an encoding format of multimedia content provided to a multimedia client of a wireless communications network (WCN) includes at least one processor configured for modifying a data structure received from a content server that associates different locators for multimedia content with respective different encoding formats for the multimedia content, to obtain a modified data structure, and operating as a proxy component of a WCN network entity between the at least one multimedia client and the content server to control an encoding format for the multimedia content provided to at least one multimedia client; and a memory coupled to the at least one processor for storing data.

According to another aspect, a computer program product includes a computer-readable medium comprising code for modifying a data structure received from a content server that associates different locators for multimedia content with respective different encoding formats for the multimedia content, to obtain a modified data structure, and operating as a proxy component of a WCN network entity between the at least one multimedia client and the content server to control an encoding format for the multimedia content provided to at least one multimedia client.

It is understood that other aspects will become readily apparent to those skilled in the art from the following detailed description, wherein it is shown and described various aspects

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
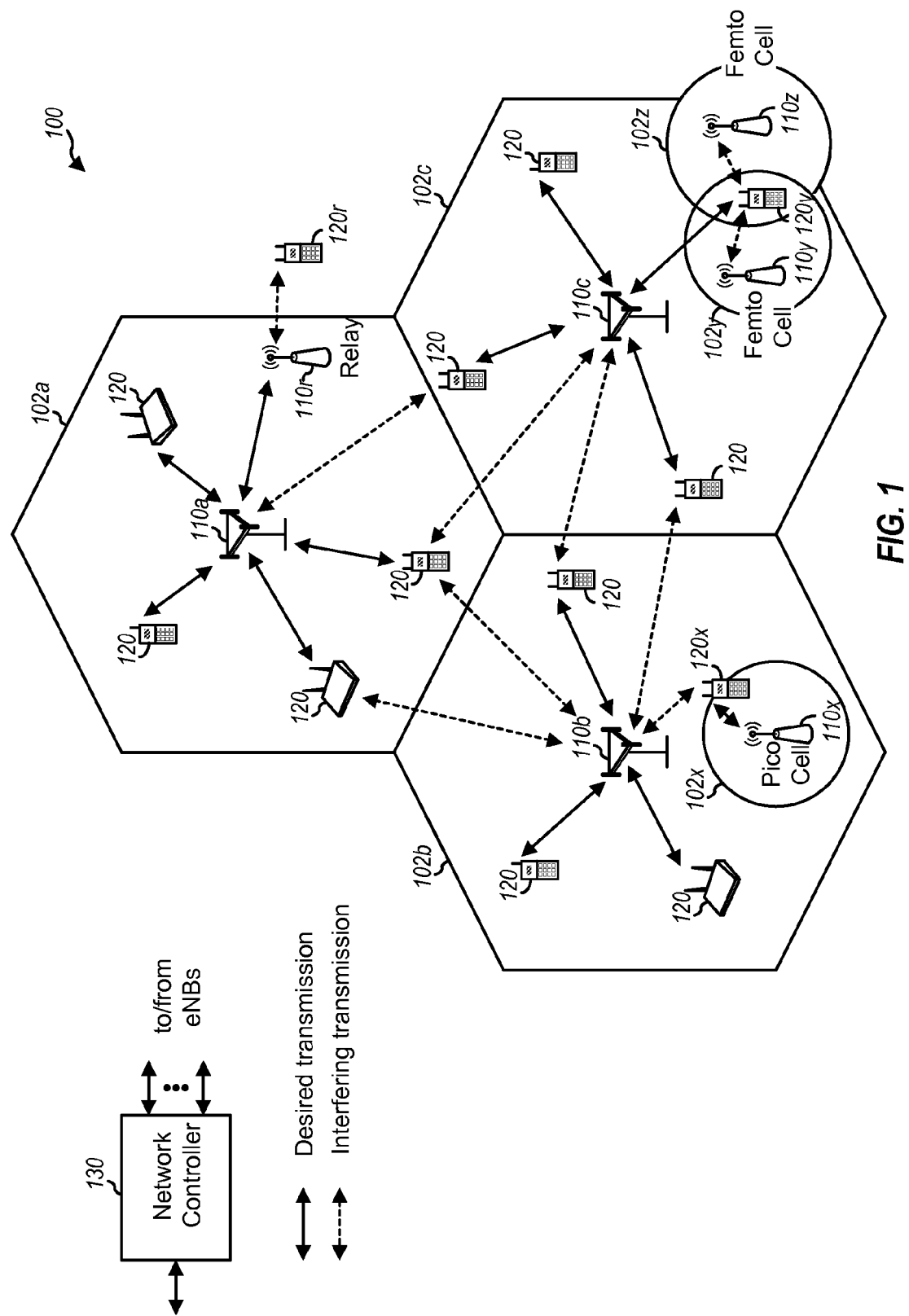
FIG. 1 is a block diagram conceptually illustrating an example of a telecommunications system.

FIG. 1 shows a wireless communication network 100, which may be an LTE network. The wireless network 100 may include a number of eNBs 110 and other network entities. An eNB may be a station that communicates with the UEs and may also be referred to as a base station, a Node B, an access point, or other term. Each eNB 110a, 110b, 110c may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB (HNB). In the example shown in FIG. 1, the eNBs 110a, 110b and 110c may be macro eNBs for the macro cells 102a, 102b and 102c, respectively. The eNB 110x may be a pico eNB for a pico cell 102x, serving a UE 120x. The eNBs 110y and 110z may be femto eNBs for the femto cells 102y and 102z, respectively. An eNB may support one or multiple (e.g., three) cells.

The wireless network 100 may also include relay stations 110r. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with the eNB 110a and a UE 120r in order to facilitate communication between the eNB 110a and the UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 Watts) whereas pico eNBs, femto eNBs and relays may have a lower transmit power level (e.g., 1 Watt).

The wireless network 100 may support synchronous or asynchronous operation. Broadcast multicast operations may require synchronization of base stations within a defined area, but the present technology is not limited thereby. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, or other mobile devices. A UE may be able to communicate with macro eNBs, pico eNBs, femto eNBs, relays, or other network entities. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
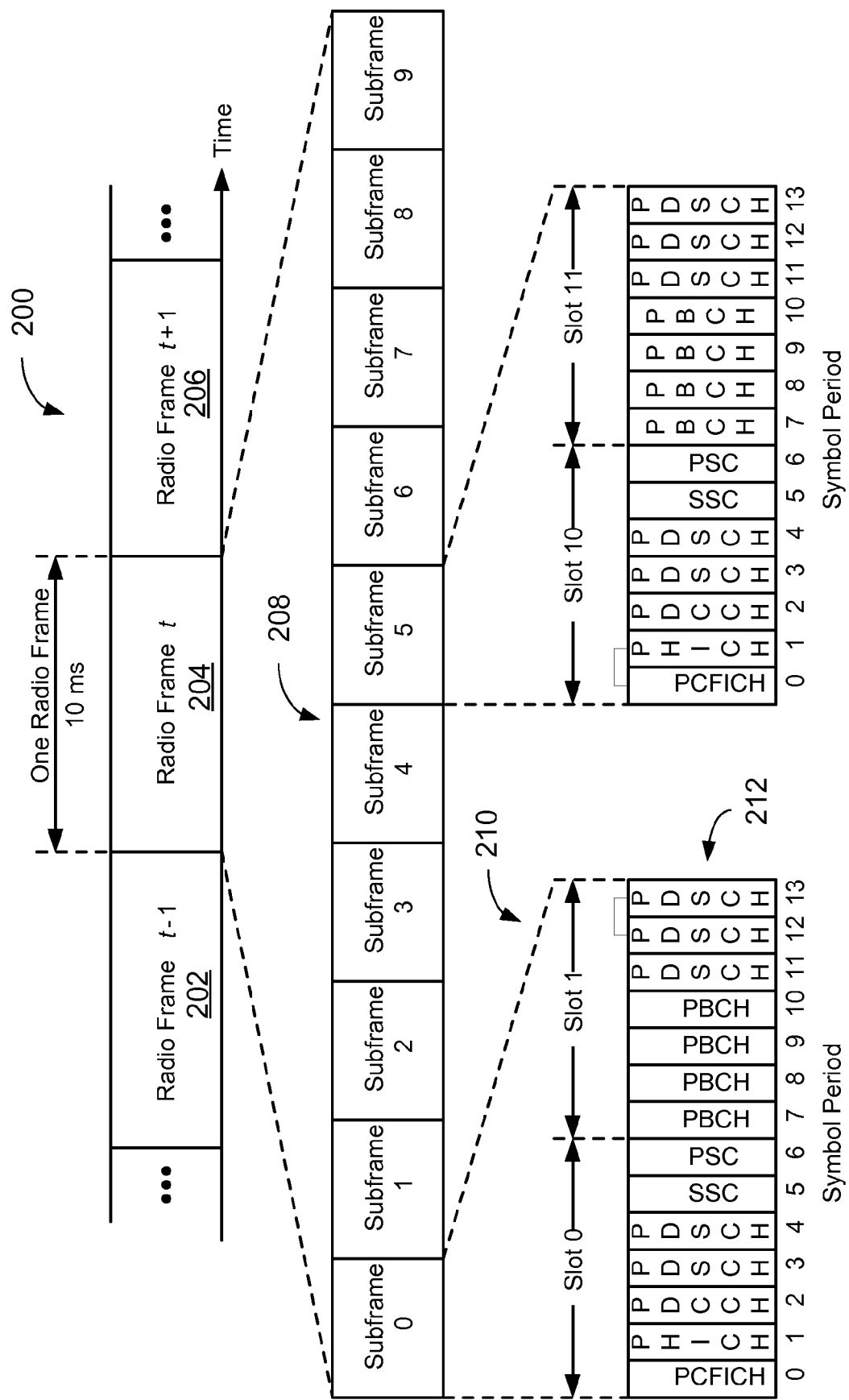
FIG. 2 is a block diagram conceptually illustrating an example of a down link frame structure in a telecommunications system.
Figure 6:
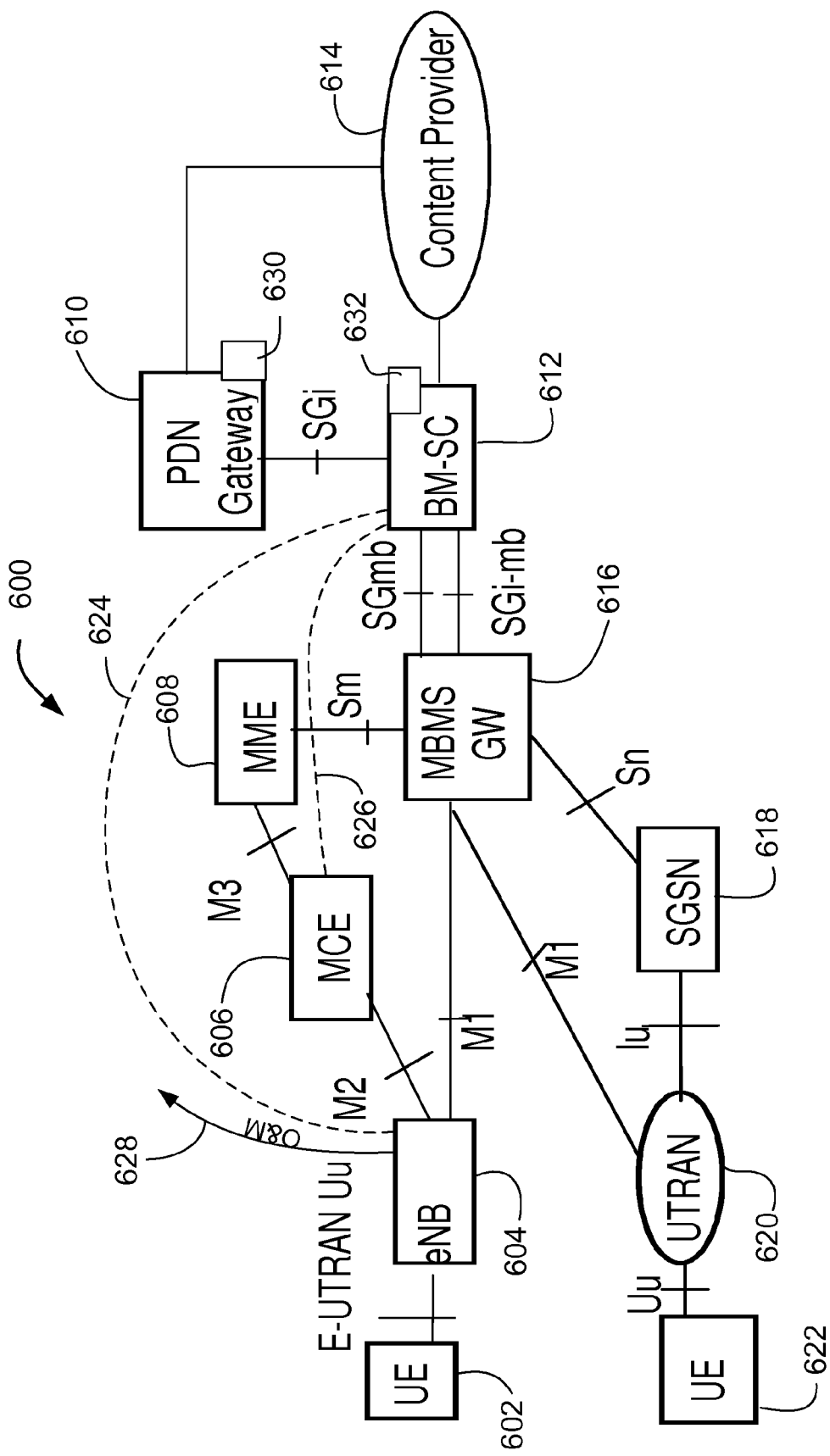
FIG. 6 is a block diagram illustrating components of a wireless communication system for providing or supporting MBSFN service.

FIG. 2 shows a down link frame structure 200 used in LTE. The transmission timeline for the downlink may be partitioned into units of radio frames 202, 204, 206. Each radio frame may have a predetermined duration (e.g., 10 milliseconds (ms)) and may be partitioned into 10 subframes 208 with indices of 0 through 9. Each subframe may include two slots, e.g., slots 210. Each radio frame may thus include 20 slots with indices of 0 through 19. Each slot may include L symbol periods, e.g., 7 symbol periods 212 for a normal cyclic prefix (CP), as shown in FIG. 2, or 6 symbol periods for an extended cyclic prefix. The normal CP and extended CP may be referred to herein as different CP types. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on resource allocation for UEs and control information for downlink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
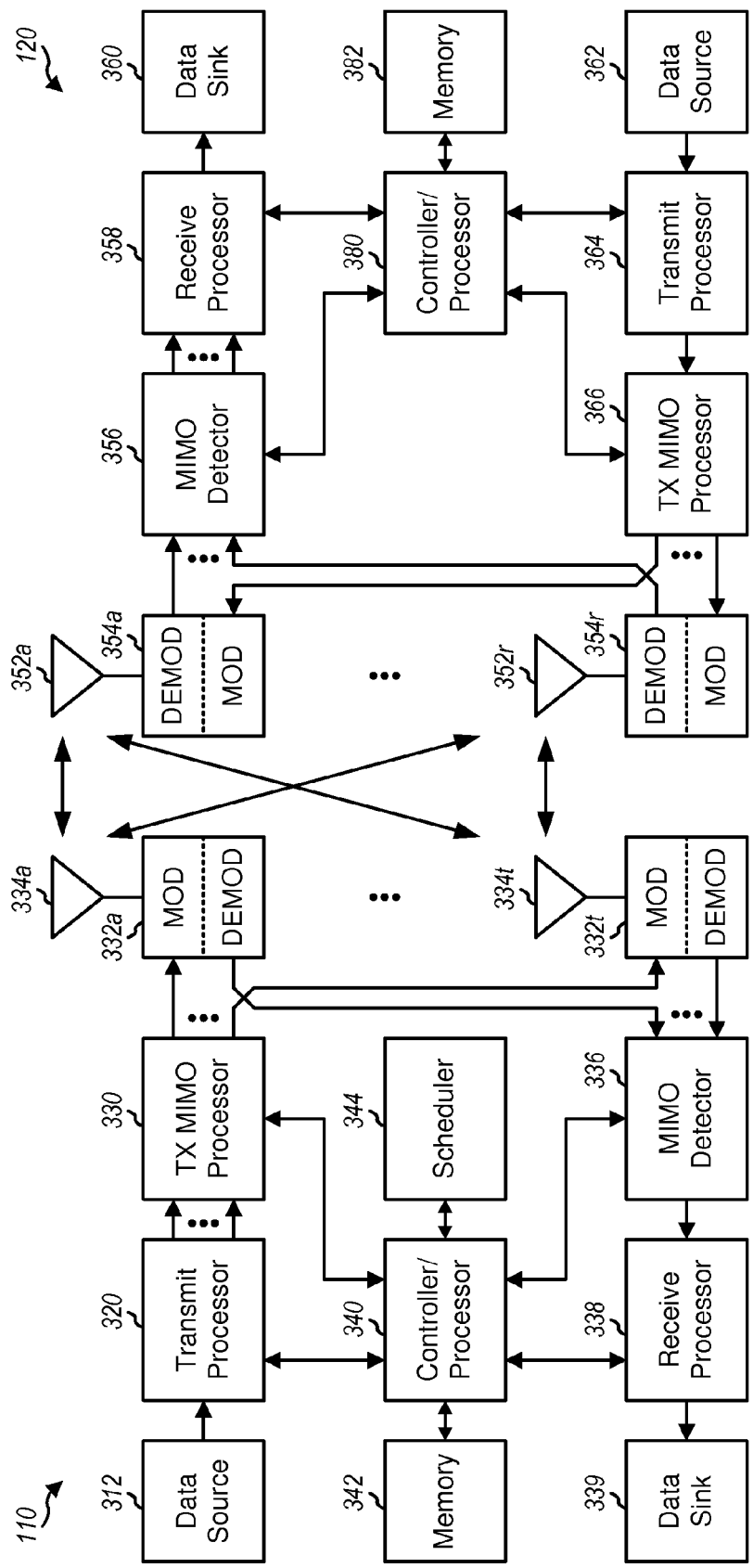
FIG. 3 is a block diagram conceptually illustrating a design of a base station/eNB and a UE configured according to one aspect of the present disclosure.

FIG. 3 shows a block diagram of a design of a base station/eNB 110 and a UE 120, which may be one of the base stations/eNBs and one of the UEs in FIG. 1. For a restricted association scenario, the base station 110 may be the macro eNB 110c in FIG. 1, and the UE 120 may be the UE 120y. The base station 110 may also be a base station of some other type. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354a through 354r (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in FIGS. 4 and 5, and/or other processes for the techniques described herein. The memories 342 and 382 may store data and program codes for the base station 110 and the UE 120, respectively. A scheduler 344 may schedule UEs for data transmission on the downlink and/or uplink.

In one configuration, the UE 120 for wireless communication includes means for detecting interference from an interfering base station during a connection mode of the UE, means for selecting a yielded resource of the interfering base station, means for obtaining an error rate of a physical downlink control channel on the yielded resource, and means, executable in response to the error rate exceeding a predetermined level, for declaring a radio link failure. In one aspect, the aforementioned means may be the processor(s), the controller/processor 380, the memory 382, the receive processor 358, the MIMO detector 356, the demodulators 354a, and the antennas 352a configured to perform the functions recited by the aforementioned means. In another aspect, the aforementioned means may be a module or any apparatus configured to perform the functions recited by the aforementioned means.

eMBMS and Unicast Signaling in Single Frequency Networks

One mechanism to facilitate high bandwidth communication for multimedia has been single frequency network (SFN) operation. Particularly, Multimedia Broadcast Multicast Service (MBMS) and MBMS for LTE, also known as evolved MBMS (eMBMS) (including, for example, what has recently come to be known as multimedia broadcast single frequency network (MBSFN) in the LTE context), can utilize such SFN operation. SFNs utilize radio transmitters, such as, for example, eNBs, to communicate with subscriber UEs. Groups of eNBs can transmit information in a synchronized manner, so that signals reinforce one another rather than interfere with each other. In the context of eMBMS, the shared content is transmitted from multiple eNB's of a LTE network to multiple UEs. Therefore, within a given eMBMS area, a UE may receive eMBMS signals from any eNB (or eNBs) within radio range. However, to decode the eMBMS signal each UE receives Multicast Control Channel (MCCH) information from a serving eNB over a non-eMBMS channel. MCCH information changes from time to time and notification of changes is provided through another non-eMBMS channel, the PDCCH. Therefore, to decode eMBMS signals within a particular eMBMS area, each UE is served MCCH and PDCCH signals by one of the eNBs in the area.

In accordance with aspects of the subject of this disclosure, there is provided a wireless network (e.g., a 3GPP network) having features relating to single carrier optimization for eMBMS. eMBMS provides an efficient way to transmit shared content from an LTE network to multiple mobile devices, such as, for example, UEs. Aspects of the disclosure are not limited to eMBMS or other multicast operation, and may also be applied to unicast operations.

With respect to a physical layer (PHY) of eMBMS for LTE Frequency Division Duplex (FDD), the channel structure may comprise time division multiplexing (TDM) resource partitioning between an eMBMS and unicast transmissions on mixed carriers, thereby allowing flexible and dynamic spectrum utilization. Currently, a subset of subframes (up to 60%), known as multimedia broadcast single frequency network (MBSFN) subframes, can be reserved for eMBMS transmission. As such current eMBMS design allows at most six out of ten subframes for eMBMS.

Figure 4:
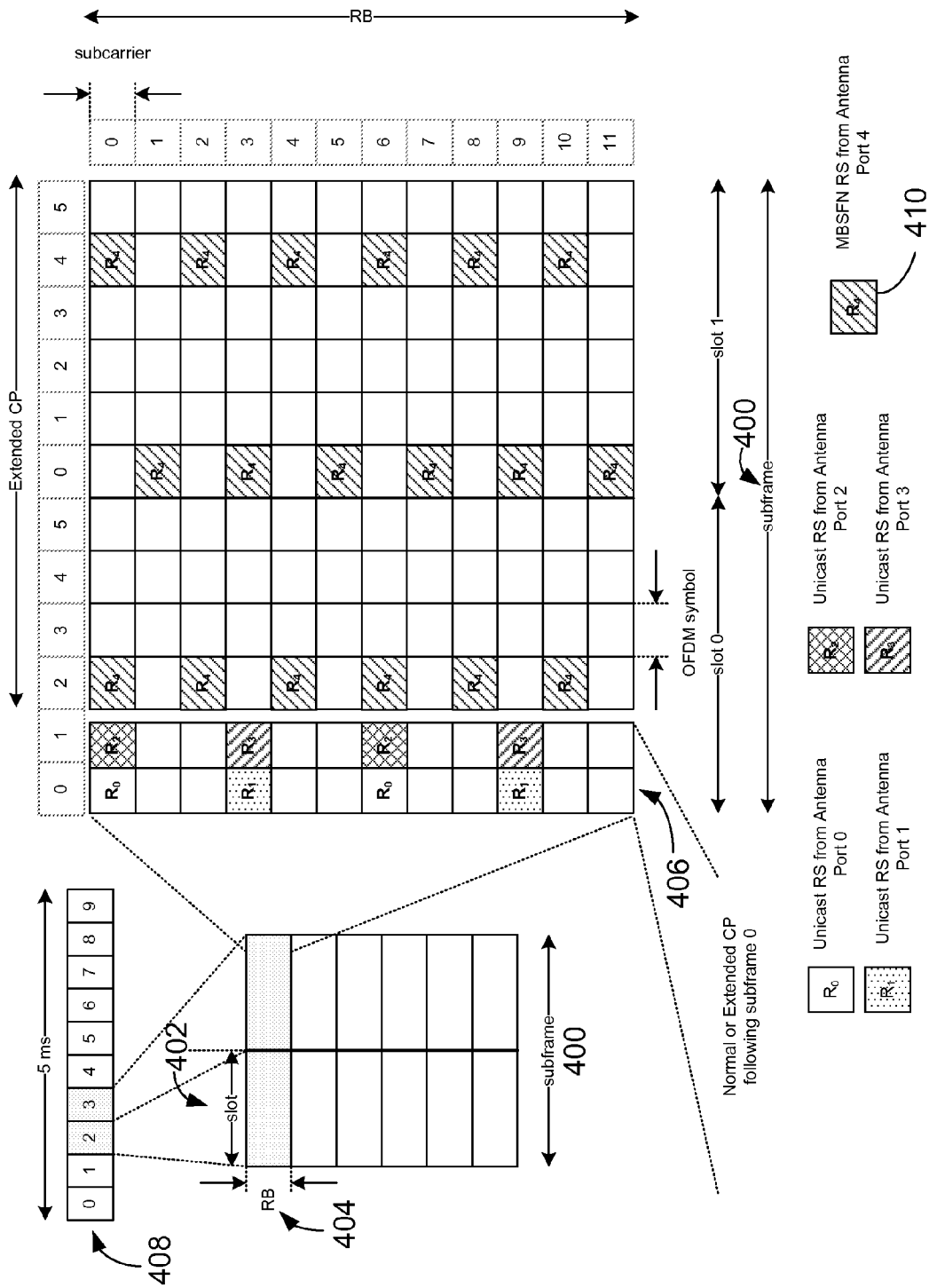
FIG. 4 is a diagram of a signaling frame illustrating an example of symbol allocation for unicast and multicast signals.

An example of subframe allocation for eMBMS is shown in FIG. 4, which shows an existing allocation of MBSFN reference signals on MBSFN subframes 400, for a single-carrier case. Components depicted in FIG. 4 correspond to those shown in FIG. 2, with FIG. 4 showing the individual subcarriers within each slot 402 and resource block (RB) 404. In 3GPP LTE, an RB 404 spans 12 subcarriers over a slot duration of 0.5 ms, with each subcarrier having a bandwidth of 15 kHz together spanning 180 kHz per RB. Subframes may be allocated for unicast or eMBMS; for example in a sequence of subframes 408 labeled 0, 1, 2, 3, 4, 5, 6, 7, 8, and 9, subframes 0, 4, 5, and 9 may be excluded from eMBMS in FDD. Also, subframes 0, 1, 5, and 6 may be excluded from eMBMS in time division duplex (TDD). More specifically, subframes 0, 4, 5, and 9 may be used for PSS/SSS/PBCH/paging/system information blocks (SIBs) and unicast service. Remaining subframes in the sequence, e.g., subframes 1, 2, 3, 6, 7, and 8 may be configured as eMBMS subframes.

With continued reference to FIG. 4, within each eMBMS subframe 400, the first 1 or 2 symbols 406 may be used for unicast reference symbols (RSs) and control signaling. A CP length of the first 1 or 2 symbols 406 may follow that of subframe 0. A transmission gap may occur between the first 1 or 2 symbols 406 and the eMBMS symbols if the CP lengths are different. In related aspects, the overall eMBMS bandwidth utilization may be 42.5% considering RS overhead (e.g., 6 eMBMS subframes and 2 control symbols within each eMBMS subframe). Known techniques for providing MBSFN RSs and unicast RSs typically involve allocating the MBSFN RSs on MBSFN subframes (as shown in FIG. 4), and separately allocating unicast RSs on non-MBSFN subframes. More specifically, as FIG. 4 shows, the extended CP of the MBSFN subframe 400 includes MBSFN RSs 410 but not unicast RSs. The present technology is not limited to the particular frame allocation scheme illustrated by FIGS. 2 and 4, which are presented by way of example, and not by way of limitation. A multicast session or multicast broadcast as used herein may use any suitable frame allocation scheme.

eMBMS Service Areas

Figure 5:
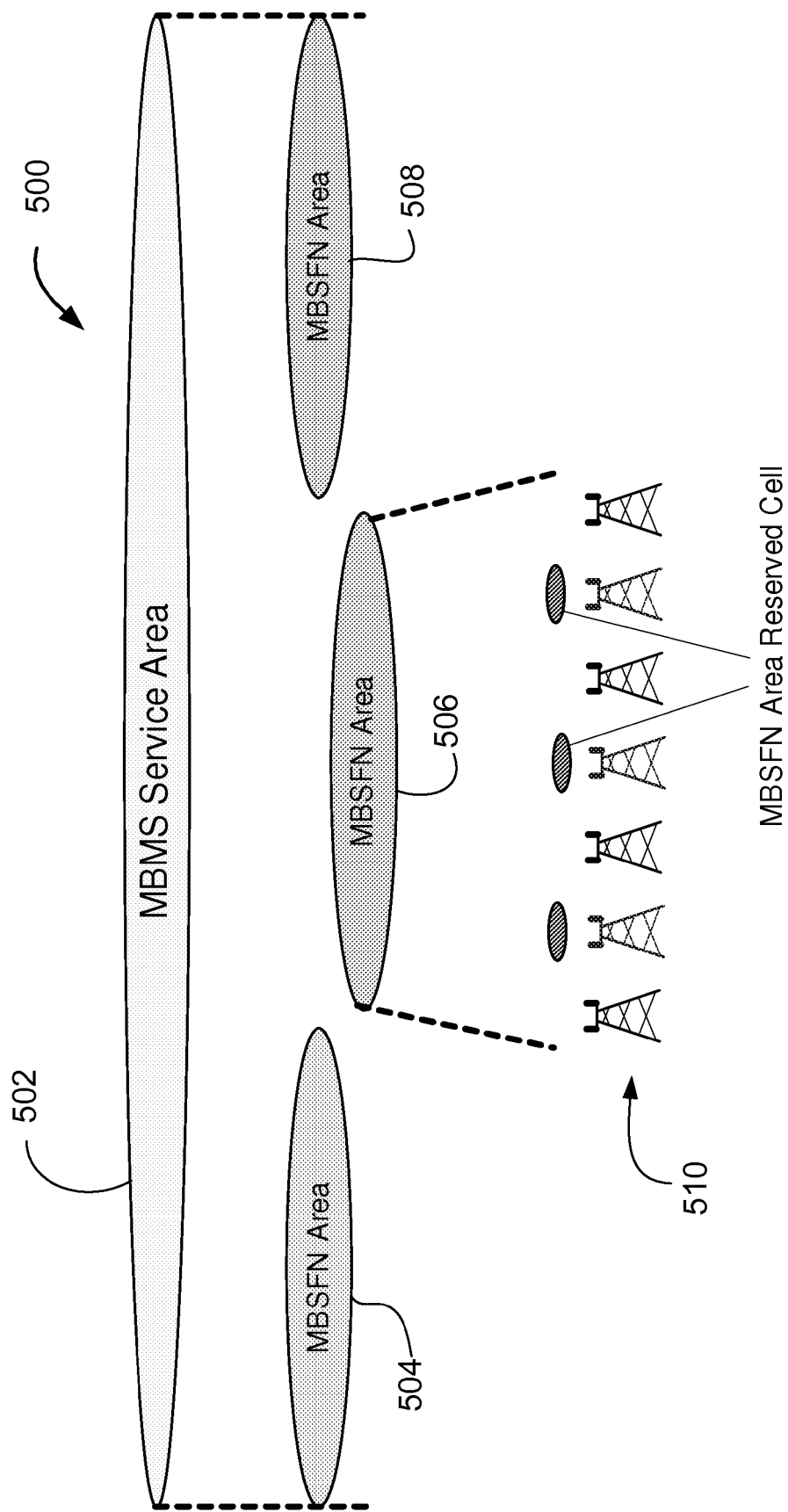
FIG. 5 is a diagram illustrating MBMS over a Single Frequency Network (MBSFN) areas within an MBSFN service area.

FIG. 5 illustrates a system 500 including an MBMS service area 502 encompassing multiple MBSFN areas 504, 506, 508, which themselves include multiple cells or base stations 510. As used herein, an "MBMS service area" refers to a group of wireless transmission cells where a certain MBMS service is available. For example, a particular sports or other program may be broadcast by base stations within the MBMS service area at a particular time. The area where the particular program is broadcast defines the MBMS service area. The MBMS service area may be made up of one or more "MBSFN areas" as shown at 504, 506 and 508. As used herein, an MBSFN area refers to a group of cells (e.g., cells 510) currently broadcasting a particular program in a synchronized fashion using an MBSFN protocol. An "MBSFN synchronization area" refers to a group of cells that are interconnected and configured in a way such that they are capable of operating in a synchronized fashion to broadcast a particular program using an MBSFN protocol, regardless of whether or not they are currently doing so. Each eNB can belong to only one MBSFN synchronization area, on a given frequency layer. It is worth noting that an MBMS service area 502 may include one or more MBSFN synchronization areas (not shown). Conversely, an MBSFN synchronization area may include one or more MBSFN areas or MBMS service areas. Generally, an MBSFN area is made up of all, or a portion of, a single MBSFN synchronization area and is located within a single MBMS service area. Overlap between various MBSFN areas is supported, and a single eNB may belong to several different MBSFN areas within a single synchronization area. For example, up to 8 independent MCCHs may be configured in System Information Block (SIB) 13 to support membership in different MBSFN areas. An MBSFN Area Reserved Cell or Base Station is a cell/base station within a MBSFN Area that does not contribute to the MBSFN transmission, for example a cell near a MBSFN Synchronization Area boundary, or a cell that is not needed for MBSFN transmission because of its location.

eMBMS System Components and Functions

FIG. 6 illustrates functional entities of a wireless communication system 600 for providing or supporting MBSFN service. Regarding Quality of Service (QoS), the system 600 may use a Guaranteed Bit Rate (GBR) type MBMS bearer, wherein the Maximum Bit Rate (MBR) equals the GBR. These components are shown and described by way of example, and do not limit the inventive concepts described herein, which may be adopted to other architectures and functional distributions for delivering and controlling multicast transmissions.

The system 600 may include an MBMS Gate Way (MBMS GW) 616. The MBMS GW 616 controls Internet Protocol (IP) multicast distribution of MBMS user plane data to eNodeBs 604 via an M1 interface; one eNB 604 of many possible eNBs is shown. In addition, the MBMS GW controls IP multicast distribution of MBMS user plane data to UTRAN Radio Network Controllers (RNCs) 620 via an M1 interface; one UTRAN RNC 620 of many possible RNCs is shown. The M1 interface is associated to MBMS data (user plane) and makes use of IP for delivery of data packets. The eNB 604 may provide MBMS content to a UE/mobile device 602 via an E-UTRAN Uu interface. The RNC 620 may provide MBMS content to a UE mobile device 622 via a Uu interface. The MBMS GW 616 may further perform MBMS Session Control Signaling, for example MBMS session start and session stop, via the Mobility Management Entity (MME) 608 and Sm interface. The MBMS GW 616 may further provide an interface for entities using MBMS bearers through the SG-mb (user plane) reference point, and provide an interface for entities using MBMS bearers through the SGi-mb (control plane) reference point. The SG-mb Interface carries MBMS bearer service specific signaling. The SGi-mb interface is a user plane interface for MBMS data delivery. MBMS data delivery may be performed by IP unicast transmission, which may be a default mode, or by IP multicasting. The MBMS GW 616 may provide a control plane function for MBMS over UTRAN via a Serving General Packet Radio Service Support Node (SGSN) 618 and the Sn/Iu interfaces.

The system 600 may further include a Multicast Coordinating Entity (MCE) 606. The MCE 606 may perform an admission control function for MBMS content, and allocate time and frequency radio resources used by all eNBs in the MBSFN area for multi-cell MBMS transmissions using MBSFN operation. The MCE 606 may determine a radio configuration for an MBSFN Area, such as, for example, the modulation and coding scheme. The MCE 606 may schedule and control user plane transmission of MBMS content, and manage eMBMS service multiplexing, by determining which services are to be multiplexed in which Multicast Channel (MCH). The MCE 606 may participate in MBMS Session Control Signaling with the MME 608 through an M3 interface, and may provide a control plane interface M2 with the eNB 604.

The system 600 may further include a Broadcast-Multicast Service Center (BM-SC) 612 in communication with a content provider server 614. The BM-SC 616 may handle intake of multicast content from one or more sources such as the content provider 614, and provide other higher-level management functions as described below. These functions may include, for example, a membership function, including authorization and initiation of MBMS services for an identified UE. The BM-SC 616 may further perform MBMS session and transmission functions, scheduling of live broadcasts, and delivery, including MBMS and associated delivery functions. The BM-SC 616 may further provide service advertisement and description, such as advertising content available for multicast. A separate Packet Data Protocol (PDP) context may be used to carry control messages between the UE and the BM-SC. The BM-SC may further provide security functions such as key management, manage charging of content providers according to parameters such as data volume and QoS, provide content synchronization for MBMS in UTRAN and in E-UTRAN for broadcast mode, and provide header compression for MBSFN data in UTRAN. The BM-SC 612 may indicate session start, update and stop to the MBMS-GW 616 including session attributes such as QoS and MBMS service area.

The system 600 may further include a Multicast Management Entity (MME) 608 in communication with the MCE 606 and MBMS-GW 608. The MME 600 may provide a control plane function for MBMS over E-UTRAN. In addition, the MME may provide the eNB 604 and UE 602 with multicast related information defined by the MBMS-GW 616. An Sm interface between the MME 608 and the MBMS-GW 616 may be used to carry MBMS control signaling, for example, session start and stop signals.

Figure 7:
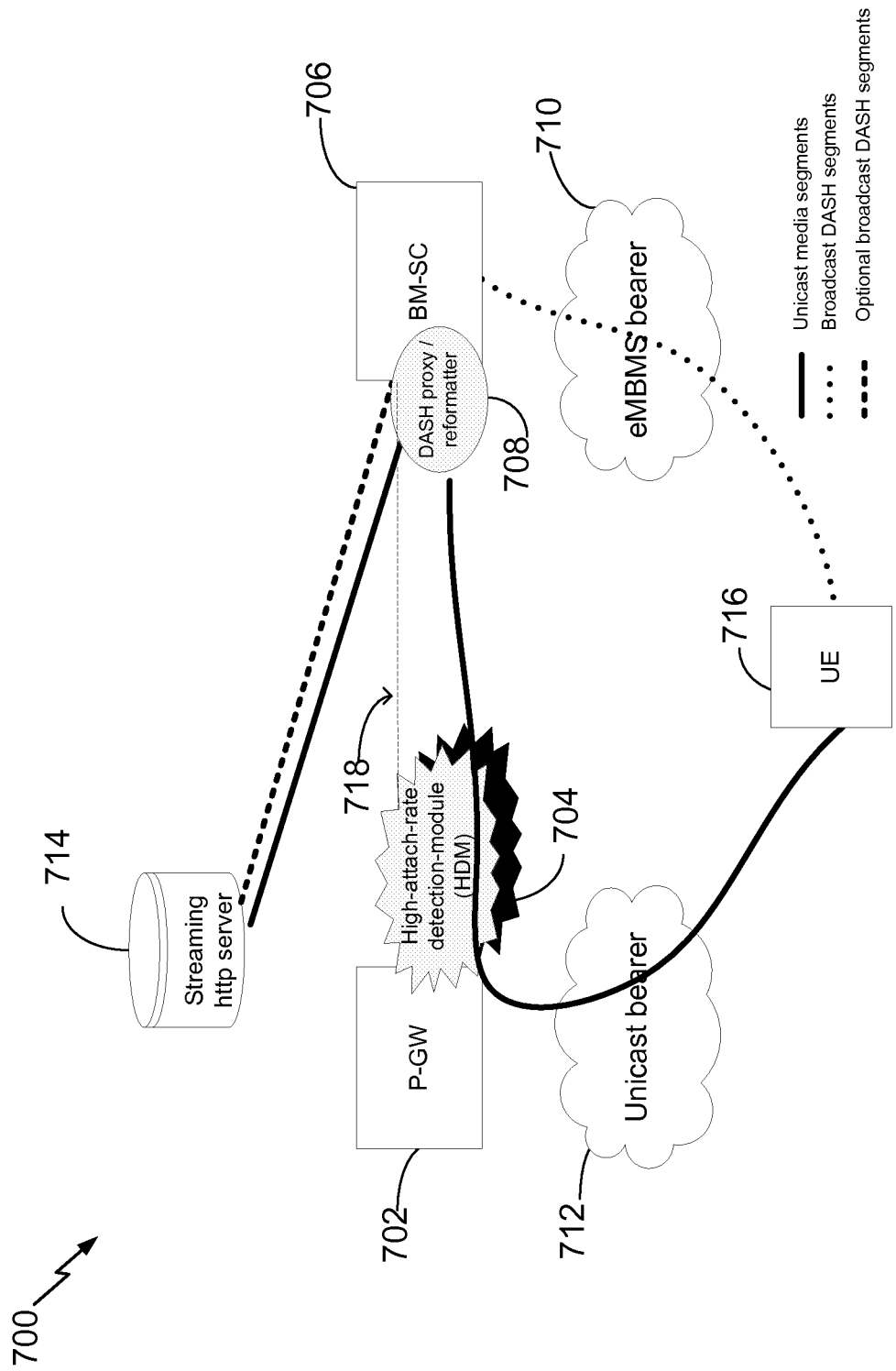
FIG. 7 is a network diagram illustrating components of a wireless communications system including data format control using redirection and proxy components.

The system 600 may further include a Packet Data Network (PDN) Gate Way (GW) 610, sometimes abbreviated as a P-GW. The P-GW 610 may provide an Evolved Packet System (EPS) bearer between the UE 602 and BM-SC 612 for signaling and/or user data. As such, the P-GW may receive Uniform Resource Locator (URL) based requests originating from UEs in association with IP addresses assigned to the UEs. The P-GW may redirect hypertext transfer protocol (HTTP) adaptive streaming requests to a proxy component 632 of the BM-SC 612, using a redirector component 630. The redirector component 630 may include, or may be associated with, a High Attach Rate Detection Module (HDM) that is shown in FIG. 7. The BM-SC 612 may also be linked to one or more content providers via the P-GW 610, which may communicate with the BM-SC 612 via an IP interface. The BM-SC may include a proxy component (or proxy entity) 632 that handles redirected adaptive streaming requests from mobile entities. The proxy component 632 is shown in FIG. 7.

The system may include new interfaces enabling direct communications between certain system components, to facilitate aspects of the methods and apparatus disclosed herein. For example, a direct interface 624 in a single communication link may be provided between the eNB 604 and the BM-SC 612. For further example, a direct interface 626 may be provided between the MCE 606 and the BM-SC 612. The eNB 604 may also be indirectly linked to various system components, including but not limited to the BM-SC, via an Operations and Maintenance (O&M) link 628.

Dynamic Adaptive Streaming

Dynamic adaptive streaming in unicast transmissions is described in 3GPP2 TS 26.247 v.1.3.0 (2011-03) "Dynamic Adaptive Streaming over HTTP (3GP-DASH)." Similar standards may include Apple Live Streaming (ALS), HTTP Live Streaming (HLS) and Adaptive HTTP Streaming (AHS). DASH as described in the foregoing document, and similar standards, operate at the mobile device level by selection of a video bit rate, resolution, or other quality factors requested by the mobile entity for the unicast connection over which a media component is being received. The mobile entity may indicate a desired QoS based on its own hardware configuration and available options for the unicast service. A QoS may be described or indicated by a "representation" in a Media Presentation Description (MPD). A network entity controlling the service quality of the unicast transmission, for example, a BM-SC, responds to the indication from the mobile entity to provide a requested service quality, e.g., video or audio bit rate, resolution, display size, or the like. More detailed aspects of a particular segment, e.g., a data format, which should generally be consistent with the segment's QoS as indicated in an MPD, may be defined in an initialization segment. This adaptive streaming capability is designed to be dynamic, meaning that the service quality can be adjusted during a unicast transmission; for example, service quality can be adjusted at a specified frame boundary or time as the unicast Signal-to-Noise Ratio (SNR) varies due to movement of the mobile device or other factors, or to support transfer of a unicast media session to an alternative wireless client.

Issues and Solutions for Control of Encoding Formats

Service quality may be related to transmission bit rates via the encoding format that is used for a particular unicast or broadcast transmissions. That is, the encoding format may determine a required transmission bit rate for a streaming or broadcast service. In general, DASH and similar standards as conceived for unicast service may rely on a feedback mechanism from the mobile device to the one or more network entities that control the service quality of the unicast transmission. The network entity controlling service quality may reside outside of the wireless communication system providing unicast transport; for example, in a content server located in a connected network. The content server may provide a data structure that enables a multimedia client (e.g., a mobile entity) to select a desired representation of multimedia content using an associated locator, for example, a network address, indicated by the MPD.

One issue that may arise in DASH and similar adaptive streaming contexts is that service quality (e.g., bit rates) may be determined by an entity outside of the control of the wireless network operator, and may therefore be incompatible with optimal service qualities for the network. For example, a third-party content server may provide an MPD indicating service options that may not be serviced by a wireless network over which the requested content segments are streamed. For further example, a relatively high bit rate option may be enabled by the content server using an MPD or similar data structure, but if several clients in a wireless area select the high data rate option, the resulting traffic may exceed the network carrying capacity. Such issues may arise because the content provider generally has an interest in providing a high quality of service, while lacking information about what level of service a particular network can support at a particular time. Existing solutions do not enable the network operator to control unicast service quality for various dynamic adaptive streaming protocols, including but not limited to DASH.

A similar issue may arise in broadcast or multicast contexts, wherein service quality of a multicast or broadcast service may be indicated by a service guide. A service guide may comprise another type of data structure that associates different locators for multimedia content with respective different encoding formats for the multimedia content. A service guide may inform a client about a broadcast/multicast signal location from which a broadcast or multicast service of particular quality may be obtained. For example, a locator may include a particular carrier and subframe index or set of indices. A service guide for broadcast or multicast content may be requested by a client at various times for multimedia content from a content source that is not providing the content in an encoded format (or formats) that would optimize a broadcast or multicast service in a particular network area. It may be desirable for the network operator to advertise and make available multimedia content in a particular area at a service quality or qualities different from what is available from a content source. For example, the clients may desire content in a lower or higher quality encoded format than the content was originally encoded in. For example, the clients may desire a lower quality encoded format because the clients may not support the high bandwidth or the clients' output screen resolution is below the original encoded format. Providing content at a different quality may require transcoding of the content by a network entity, to obtain data in a desired format for broadcast. Existing solutions do not enable an efficient, integrated control of service announcement and transcoding functions for multicast and broadcast contexts. Transcoding may also be desired in unicast contexts, for similar reasons.

Mixtures of the foregoing issues may arise in demand-based multicast or broadcast contexts. In demand based contexts, a service may be transitioned from unicast delivery to broadcast/multicast deliver, or vice-versa. Therefore aspects of both unicast and broadcast/multicast issues as summarized above may be present.

These and other issues may be resolved by the methods, systems and apparatus as disclosed herein, which, among other things, may enable efficient yet flexible control of service quality by a wireless network operator of multimedia content distribution from third party and other content providers, whether via unicast adaptive streaming, broadcast, multicast, or in association with transitions between unicast and broadcast delivery modes.

Referring to FIG. 7, a high-level view of a wireless communications system 700 may include a UE 716 receiving multimedia content (e.g., streaming digital audio-video content) from a content server 714. The UE 716 and content server 714 may use a DASH protocol, or other adaptive streaming protocol. In a one aspect, the UE 716 may direct DASH packet requests directly to the content server 714, and receive content directly from the server 714. While this may still occur, under some controllable conditions, a redirection component 704 somewhere between the UE 716 and content server 714 (e.g., associated with or in the P-GW 702) may intercept a request and redirect it to the BM-SC 706, which may include a DASH proxy and transcoding component 708. The redirection component 704 may include or be associated with an HDM. For example, the HDM may count the number of UEs accessing the same service or content via unicast transmission from the same area to determine an aggregate demand. When the HDM detects a high count of UEs accessing the same service/content ("high interest"), the redirection component 704 may redirect requests based on the high interest. Redirection of the request may be based on whether the request is from a UE that is subscribed to the eMBMS service. A signaling interface 718 may be included between the redirection component 704 and BM-SC 706 for redirecting the requests. The proxy component 708 may process the request, optionally altering the request, and send it to the server 714. In doing so, the proxy component 708 may appear to be the UE 716, from the point of view of the server 714. The server 714 may generally comprise a third party node that may not be under the control of the operator of nodes 702, 706 and other nodes. In response to the request, the server 714 may direct the multimedia content back to the proxy component 708. If the content is to be delivered via unicast, the proxy component 708 may relay the multimedia content to the UE 716 via the P-GW 702 and unicast bearer 712. If the content is to be delivered by broadcast, the proxy component 708 may relay the content to the UE via the eMBMS bearer 710.

Figure 8:
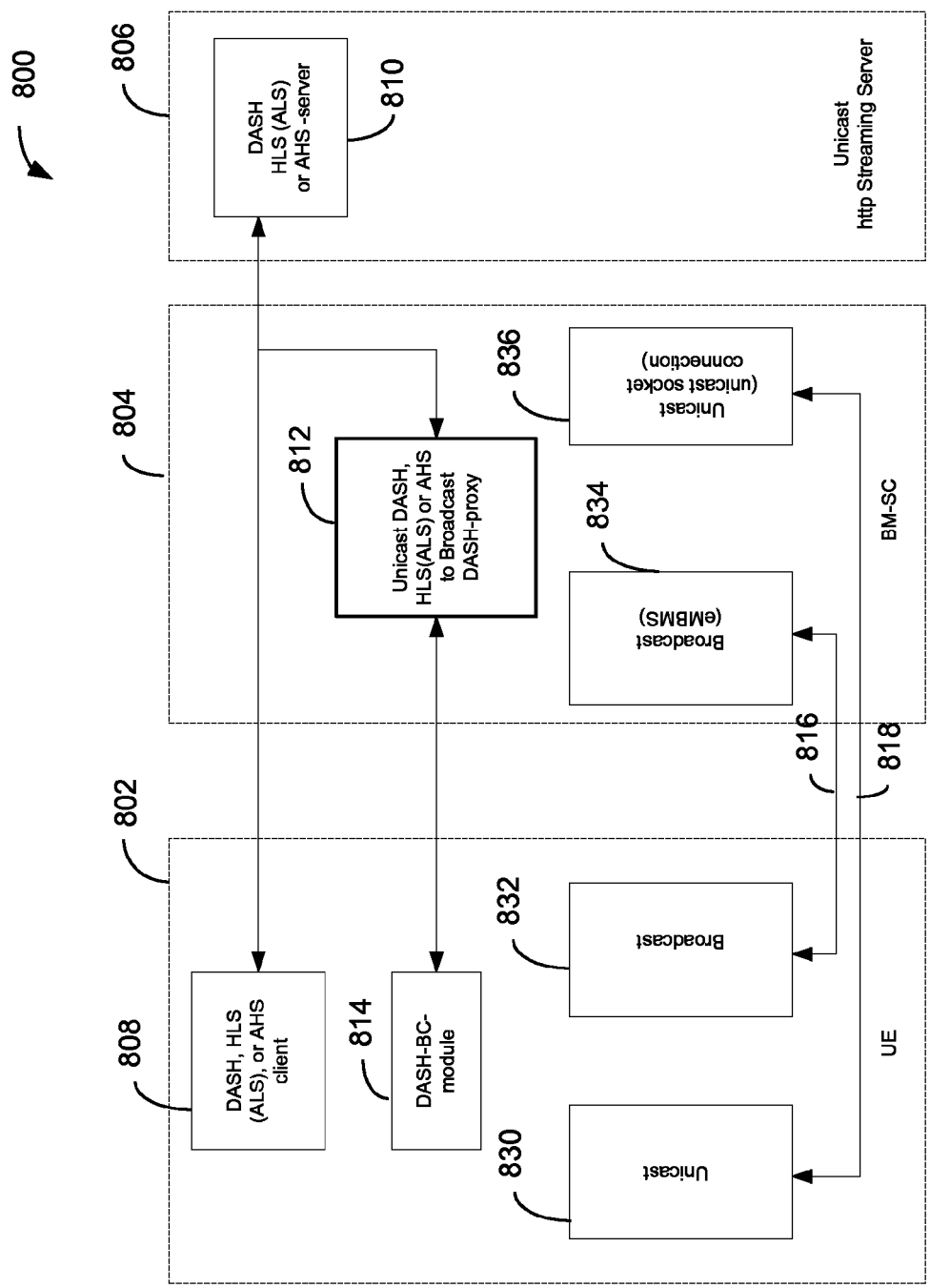
FIG. 8 is a block diagram illustrating more detailed aspects of components of a system as shown in FIG. 7.

FIG. 8 shows more detailed components of a system 800 including a UE/mobile entity 802, a BM-SC 804 and a content server 806. The UE 802 may communicate directly (i.e., via components of a communications network but without alteration of communicated information) with the content server 806; more particularly, a DASH, HLS, ALS, AHS, or similar adaptive streaming client component 808 of the UE 802 may communicate directly with a corresponding DASH, HLS, ALS, AHS, or similar adaptive streaming server component 810, respectively, of the server 806. In addition, the redirection component may selectively redirect the adaptive streaming communications from the UE 802 to a proxy component 812 of the BM-SC 804, optionally using a conditional redirection component (not shown). The proxy component 812 may, in turn, communicate with the adaptive streaming server component 810, appearing to the content server 806 to be indistinguishable from the client 802. In the alternative, or in addition, the UE may include an adaptive streaming (e.g., DASH, HLS, ALS, AHS, or similar) component 814 that communicates directly with the proxy component 812 for broadcast communications.

For example, using a DASH implementation, the proxy component 812 may register as a client with the content server 806, and from said server acquire a Media Presentation Description (MPD), for example, as described below with respect to FIG. 9B, or similar metadata. Using the MPD, the proxy component 812 may select the desired representation to utilize for broadcast service, wherein a representation indicates certain aspects of the available data format for streaming, including at least aspects pertinent to a required data rate for streaming to the UE 802. The MPD may also specify a different address, for example a Uniform Resource Locator (URL), for each available format. The proxy component 812 may process the MPD from the content server 806, and construct a new MPD to describe an operator-selected representation for delivery of the requested content to broadcast capable devices (or in the alternative, for unicast delivery). This MPD and an associated Initialization Segment (IS) may be provided as part of a service description by the proxy component 812 for broadcast distribution 816 from a broadcast module 834 of the BM-SC 804 to a broadcast module 832 of the UE 802. Delivery of the service description may be either via unicast 818 or broadcast delivery 816. Delivery of content via unicast transmission may be provided from a unicast module 836 of the BM-SC 804 to a unicast module 830 of the UE 802. Data structures similar to the MPD, Initialization Segment and representation may also exist in non-DASH formats.

Figure 9A:
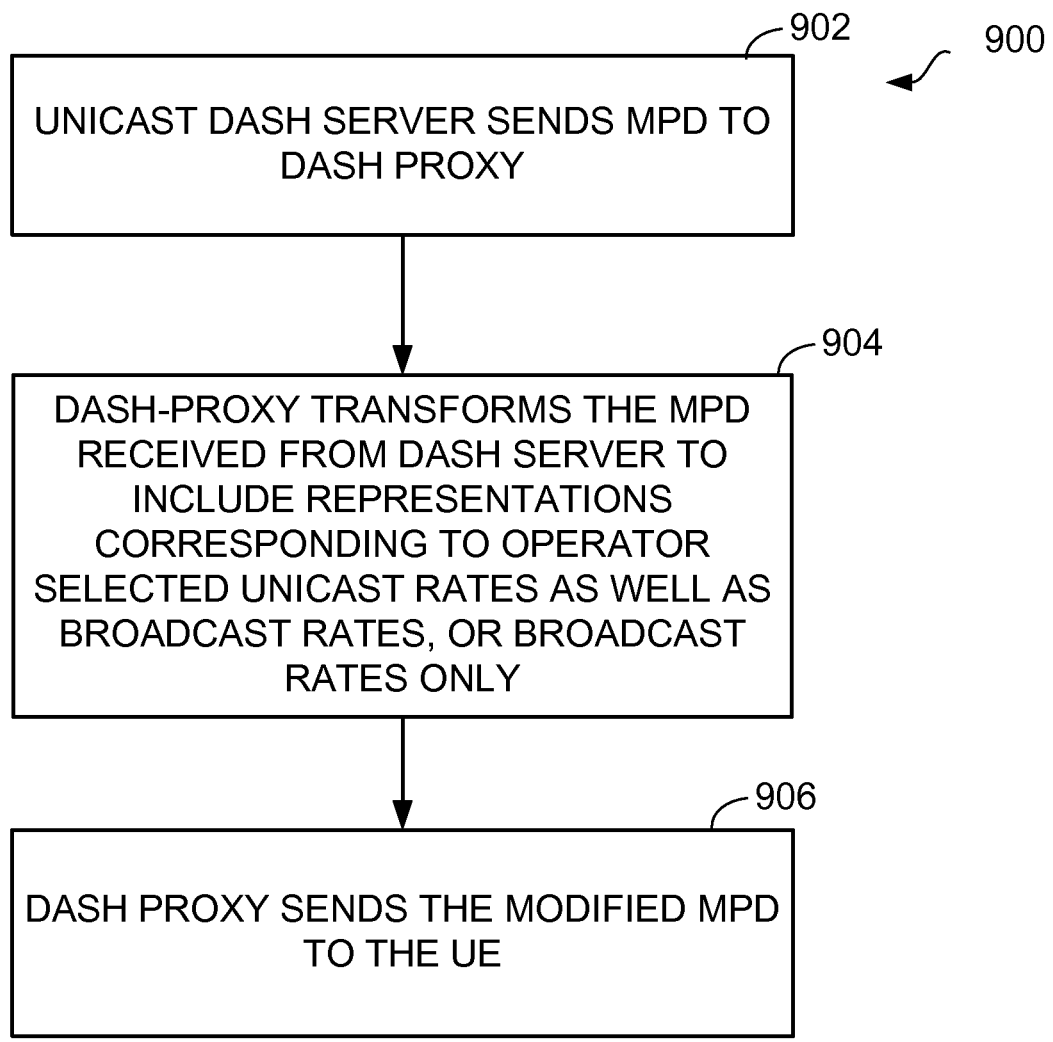
FIG. 9A is a flow chart illustrating a method for operating a DASH proxy.

FIG. 9A shows a method 900 that may be performed by a system 700 or 800 using a DASH or similar adaptive streaming protocol. At 902, a content server that is serving content for unicast or multicast distribution may send an MPD for particular multimedia content to a DASH proxy. At 904, the DASH proxy may transform the MPD received from the DASH server. The transformation 904 may include a transformation to include one or more representations according to predefined control schemes such as network operator-selected rates for unicast or broadcast delivery, or a representation corresponding to a broadcast rate only. The predefined control schemes may be configured by the network operator or received from another network entity.

In the alternative, or in addition, the transformation 904 may include a transformation to remove or exclude one or more representations corresponding to content server-supported rates that the operator of the delivery network does not support. At 906, the DASH proxy may transmit the transformed MPD to the UE. Subsequent to 906, the UE may use the representations defined in the MPD to request data in a format controlled by the proxy component from the content server.

The above method 900 may be used to address a potential issue wherein original source representations from a content server are different than the desired output format from the broadcast server. In general, it is possible to transformat or reformat content streamed from the content server from the content's listed formats to the DASH format. In this process certain parameters may be mapped directly from one format to the other. If none of the available representations from a source unicast server (content server) meet the network requirement for bit rate, the media within the individual files may be decoded and re-encoded (e.g., transcoded) at some loss of quality and/or increase or decrease in bit rate. It is preferable to do media data re-encoding from the highest quality representation available. The loss of bit rate efficiency may be addressed via the use of a more efficient codec, such as H.265. An advantage to re-encoding media data may be that Random Access Point (RAP) locations may be changed or inserted in the representation in order to provide the desired or consistent behavior among all broadcast services. RAP locations enable random access to the representation by the clients.

In some embodiments, a gateway (e.g., P-GW) in the relevant network may detect new requests for a high attach rate URL and redirect these requests to an appropriate broadcast service URL. The network may further block and/or otherwise terminate the unicast services and redirect devices receiving the unicast services to the broadcast service, as well.

In an aspect, the method 900 may include providing the content server with information detailing of the number of devices being served via broadcast, and device identity information. This data may be provided from a usage tracking server.

Figure 9B:
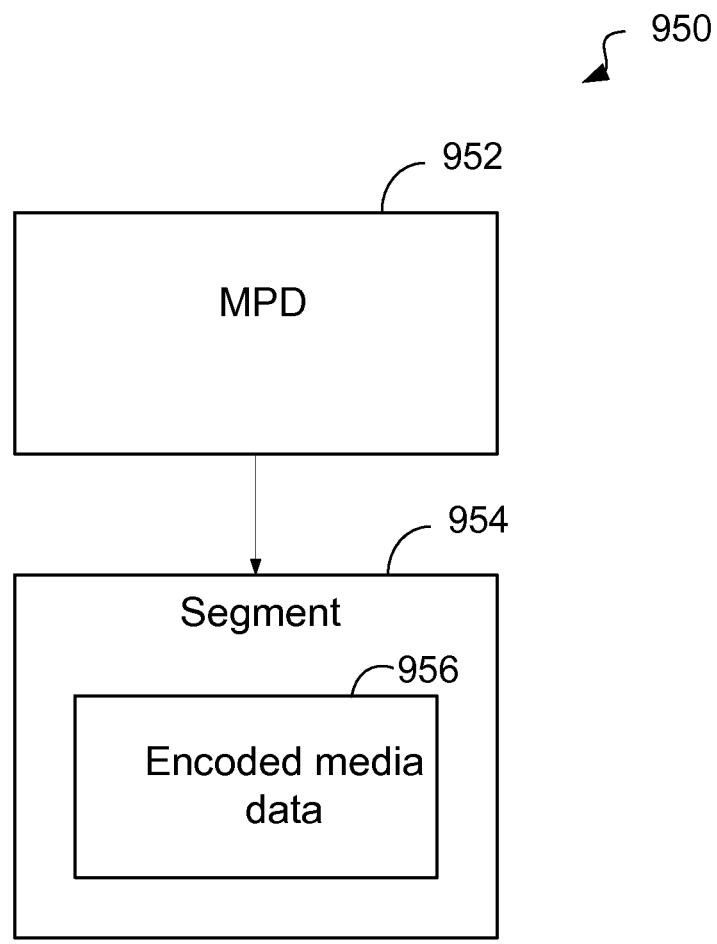
FIG. 9B is a block diagram illustrating aspects of a DASH protocol pertinent to delivery of multimedia content.

FIG. 9B shows details pertinent to multimedia content 950. Multimedia content may exist in two parts: metadata in the form of an MPD 952, and segments 954 containing the actual encoded media data 956 as a multimedia bitstream. The MPD 952 may be delivered to a client along with other service description metadata, either in response to a unicast get request, or via broadcast delivery. These metadata items are not part of the media data fetch. At least one of the segments 954 (e.g., a first segment) may be an Initialization Segment (IS), without encoded media data 956, defining details of the data format for the other segments 954. The MPD 952 may describe a URL address from which to fetch media data for the UE, for unicast delivery. Alternatively, the URL address may appear on the receiving device for broadcast delivery. Broadcast delivery may feed a cache on the UE.

Figure 9C:
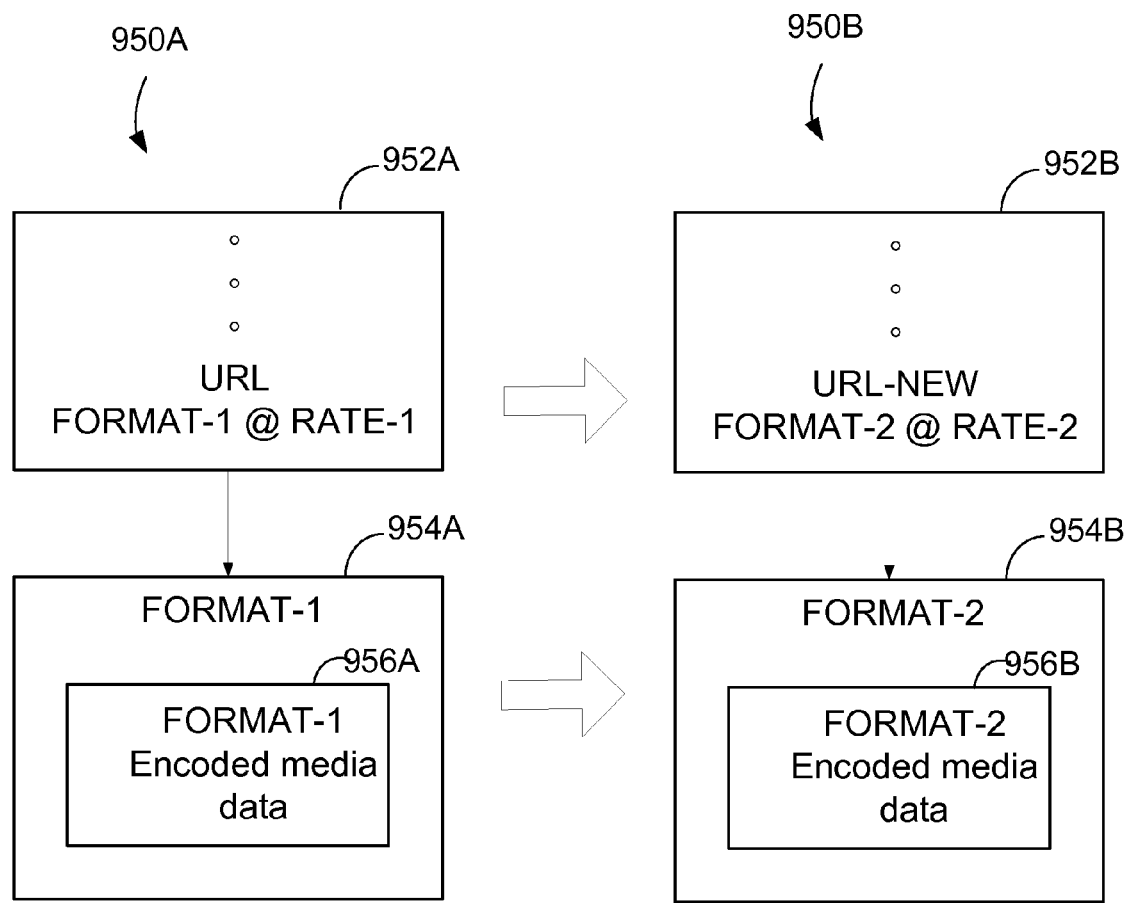
FIG. 9C illustrates an exemplary conversion of multimedia content 950A-B.

FIG. 9C illustrates an exemplary conversion of multimedia content 950A-B. A range of changes allowed to the MPD 952 by a proxy component may include, for example, converting available multimedia content 950A from a first format to multimedia content 950B in a second format desired for broadcast, and altering a description 952A to 952B accordingly. In addition, the proxy component may reformat the description from 952A to 952B. The altered or reformatted description may include a new URL for locating the converted multimedia content 950B. In addition, or in an alternative, the proxy component may re-encode the media data from 956A to 956B. The original and target video codecs (video formats) may include any one of MPEG2, MPEG4, H.264, H, 265, etc. In another alternative, or in addition, the proxy component may change the media data file wrapper format from 954A to 954B.

Figure 10:
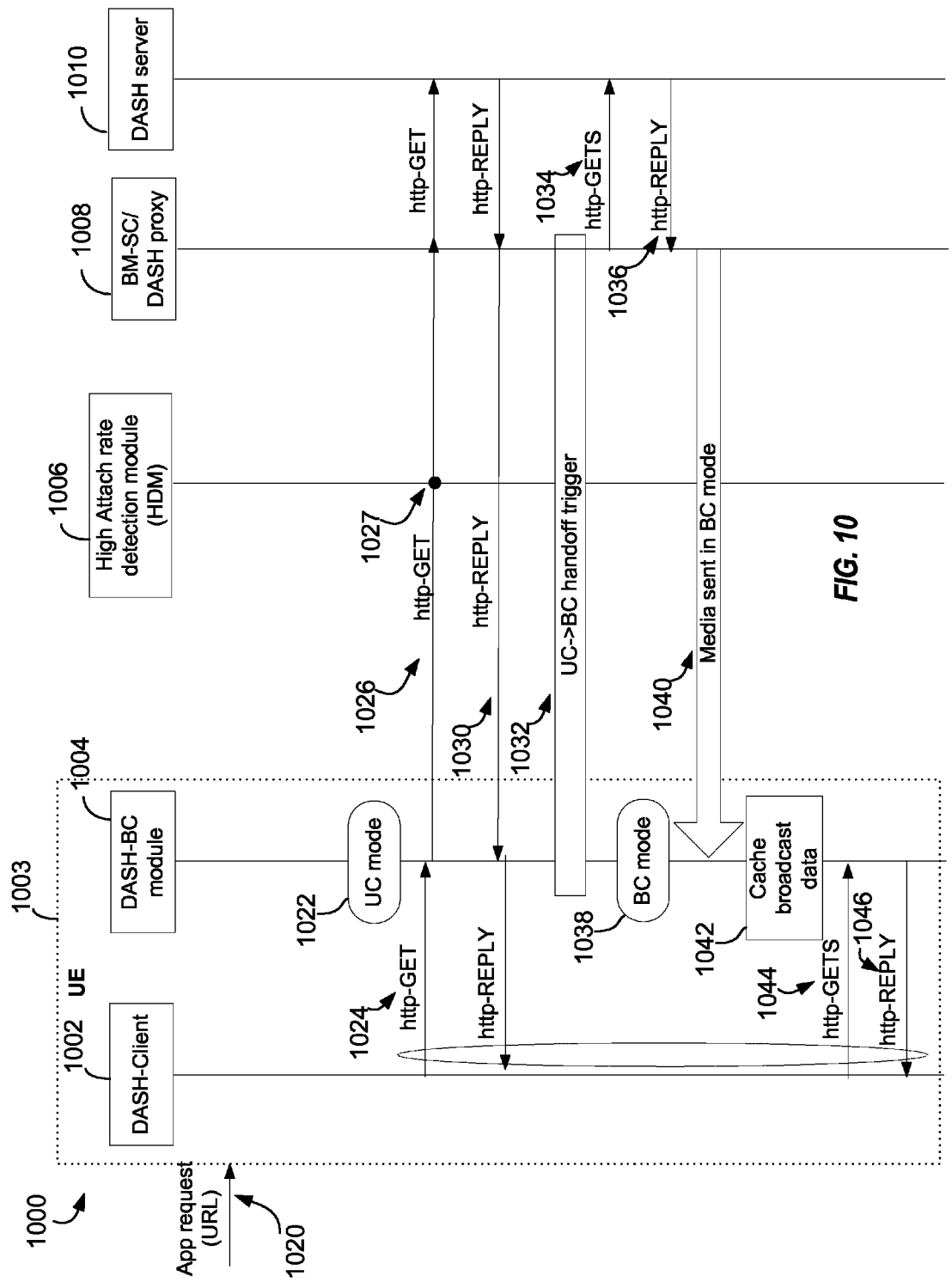
FIG. 10 is a call diagram illustrating aspects of a method for using a system as shown in FIG. 7 to control the providing of multimedia content from a content server to a mobile entity.
Figure 11:
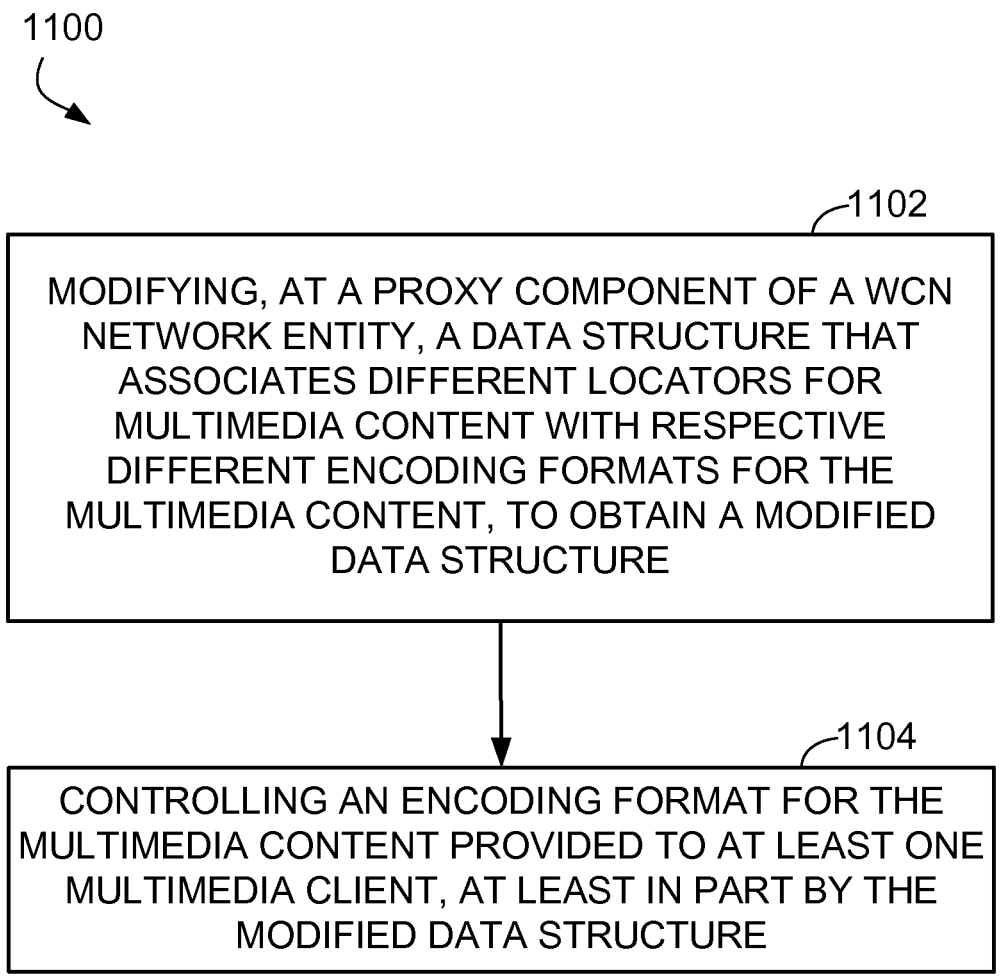
FIGS. 11-14 illustrate embodiments of a methodology for controlling data rates using a proxy component in an adaptive streaming service context.

FIG. 10 illustrates an exemplary call flow 1000, by way of example only. The utilization of a single method for broadcast file streaming may simplify the qualification process for UEs, because each UE may need to only support broadcast DASH, rather than multiple methods. A corresponding saving in design may be realized to the extent that the UE design for broadcast is common for all unicast formats. The transforming entity (e.g., proxy component) need only be qualified once, instead of qualifying each new UE. New UEs may be released multiple times per year.

Since DASH uses HTTP as the transport protocol, a client UE 1002 sets up a unicast connection with the DASH server 1010. The DASH proxy 1008 intercepts HTTP requests generated by the UE 1002. This may be achieved by the DASH proxy 1008 acting as the endpoint of a unicast socket connection set up by the UE 1002. As described above, the UE thereby uses the transformed URLs modified by the proxy component 1008 to fetch the DASH segments for the multimedia content. To hide the transformation from the DASH server 1010, the DASH proxy 1008 may reverse the transformation of the URL representation to the original unmodified format before relaying the HTTP request from the client 1002 to the DASH server 1010. Because the DASH server 1010 receives requests via the unmodified URLs, the transcoding at the DASH proxy 1008 may be transparent to the DASH server 1010.

In addition, while delivering the DASH segments over eMBMS, the DASH proxy 1008 may process DASH content it obtains from the DASH server 1010 using HTTP, and transition the content to another transport mechanism such as File Delivery Over Unidirectional Transport (FLUTE), such as is used to deliver files over a broadcast transport.

In the event of new encoding introduced at the DASH proxy 1008, the DASH proxy 1008 may use the new encoded form while responding back to the DASH client 1002 based on the content it receives from the DASH server 1010 using the representation the DASH server 1010 supports. As noted above, the location may appear on the receiving device 1004 for broadcast delivery, and broadcast delivery may feed a cache on the UE broadcast module 1004.

The exemplary call flow 1000 may proceed as follows. At step 1020, an application at the UE 1003 requests content found at a URL. At step 1024, the DASH client 1002 at the UE 1003 requests the content via an HTTP-GET. The DASH-BC 1004 in unicast mode 1022 forwards the request at 1026 to the DASH server 1010. The HDM 1006 may detect high demand for content by counting the number of UEs accessing the same content from the same area at 1027. The HDM 1006 may send an indication of the high demand to the DASH-proxy 1008. At step 1030, the DASH server 1010 responds to the request with an HTTP-REPLY message via the BM-SC and P-GW (e.g, 610 of FIG. 6) to the UE 1003. At step 1032, based on the high demand, the DASH-proxy 1008 may decide to establish an eMBMS session. At steps 1034, 1036 the DASH-proxy 1008 retrieves the content from the DASH server 1010. The UE 1003 enters broadcast mode 1038 and receives the content via broadcast delivery at step 1040. The content may be cached 1042 at the UE 1003 (e.g., at the DASH-BC 1004) for delivery to the DASH client 1002 at steps 1044, 1046.

EXAMPLE METHODOLOGIES AND APPARATUS

By way of additional example, further methodologies that may be implemented in accordance with the disclosed subject matter may be better appreciated with reference to various flow charts. For purposes of simplicity of explanation, methodologies are shown and described as a series of acts/operations. However, the claimed subject matter is not limited by the number or order of operations, as some operations may occur in different orders and/or at substantially the same time with other operations from what is depicted and described herein. Moreover, not all illustrated operations may be required to implement methodologies described herein. It is to be appreciated that functionality associated with operations may be implemented by software, hardware, a combination thereof or any other suitable means (e.g., device, system, process, or component). Additionally, it should be further appreciated that methodologies disclosed throughout this specification are capable of being stored as encoded instructions and/or data on an article of manufacture to facilitate transporting and transferring such methodologies to various devices. Those skilled in the art will understand and appreciate that a method could alternatively be represented as a series of interrelated states or events, such as in a state diagram.

Network Entity/BM-SC

FIGS. 11-14 illustrate related methodologies for controlling an encoding format for multimedia content provided to a multimedia client of a wireless communications network (WCN), using a proxy component at a BM-SC or other network entity. The multimedia client may be, or may include, a mobile entity. The encoding format may include, or may imply, a data rate for a unicast adaptive streaming segment, a data rate for a broadcast transmission, or related parameters. As used herein, a broadcast generally includes multicast, for example MBMS or eMBMS. A broadcast may also include other types of broadcasts, including those that are not multicast. The method 1100 may be used with unicast delivery of multimedia content in response to dynamic adaptive streaming over HTTP, or similar protocols. The method 1100, or aspects of the additional operations shown in the related figures, may also be used with a broadcast protocol that is downlink only, such that any mobile device receiving the multicast transmission does not provide feedback to the BM-SC, or in a transition from a unicast deliver to a multicast delivery. Method 1100 shown in FIG. 11 may include, at 1102, modifying, at a proxy component of a WCN network entity, a data structure that associates different locators for multimedia content with respective different encoding formats for the multimedia content, to obtain a modified data structure. The proxy component may modify the data structure in various different ways, which are not necessarily mutually exclusive, described below in connection with FIG. 12.

It should be appreciated that "encoding format" as used in 1102 and related operations refers primarily to a file wrapper, or a structure for defining metadata, used for unicast streaming or broadcast streaming, as described above in connection with FIG. 9B. This encoding format is directly related to a transmission data rate of the content data, meaning that the encoding format determines a maximum achievable data rate for a given transmission medium and conditions. In other contexts, an encoding format may refer to a multimedia format, which is not directly related to a unicast/multicast/broadcast data rate. Multimedia formats may be indirectly related to data rates in that, for example, higher definition formats may benefit from higher transmission data rates to permit a faster frame rate, and so forth. For example, a higher definition format (e.g., 1080 p resolution) requires a higher transmission data rate per video frame than a lower definition format (e.g., 480 p). The same high transmission data rate may allow a certain frame rate (e.g., 60 Hz) for the higher definition format and an even higher frame rate (e.g., above 60 Hz) for the lower definition format. The benefits, however, to viewing the lower definition format at frame rates above a certain frame rate (e.g., 60 Hz) may be insignificant.

The data structure, modified data structure, or both, may be (or may include) a Media Presentation Description (MPD) defining addresses for respective media representations, according to a Dynamic Adaptive Streaming over HTTP (DASH) protocol. In the alternative, or in addition, the data structure may be, or may include, an Initialization Segment (IS). The encoding format may be an aspect of a more comprehensive QoS using parameters such as bit rate, media type, resolution, frame rate, or other parameters related to bandwidth required for the multicast transmission. Such parameters may be indicated by a representation defined in an MPD. In the alternative, or in addition, the data structure may be, or may include, a service guide for a broadcast service. The service guide may include locators for a broadcast service or multicast service and an indication of an encoding format and/or service quality.

The method 1100 may further include, at 1104, controlling an encoding format for the multimedia content provided to at least one multimedia client, at least in part by the modified data structure. Other operations, including but not limited one or more of the additional operations 1200, 1300, and 1400, may be performed to effect control of the encoding format. For example, in some embodiments, control may be further effected by providing the data structure from the proxy component to the client. The proxy entity or proxy component may provide a client interface to the content server, such that the content server interacts as it otherwise would with the multimedia client. Likewise, the proxy component may provide a content server interface to the multimedia client, so that the multimedia client interacts with the proxy component as the multimedia client would with the content server. Thus, the proxy component may be transparent to both the content server and the multimedia client. Behind this transparency, however, the proxy component may alter one or more messages between the multimedia client and the content server so as to control a data transmission rate for requested multimedia content, and other parameters as indicated by a representation of an MPD or service guide. For example, the proxy component may alter the data structure so that the multimedia client can only select an encoding format or QoS that is allowed or enabled by the proxy component. For further example, the proxy component may control an encoding format for a broadcast transmission by acting as a one-to-many client for the content server. More detailed aspects and examples are provided below, in connection with FIGS. 12-14.

Figure 12:
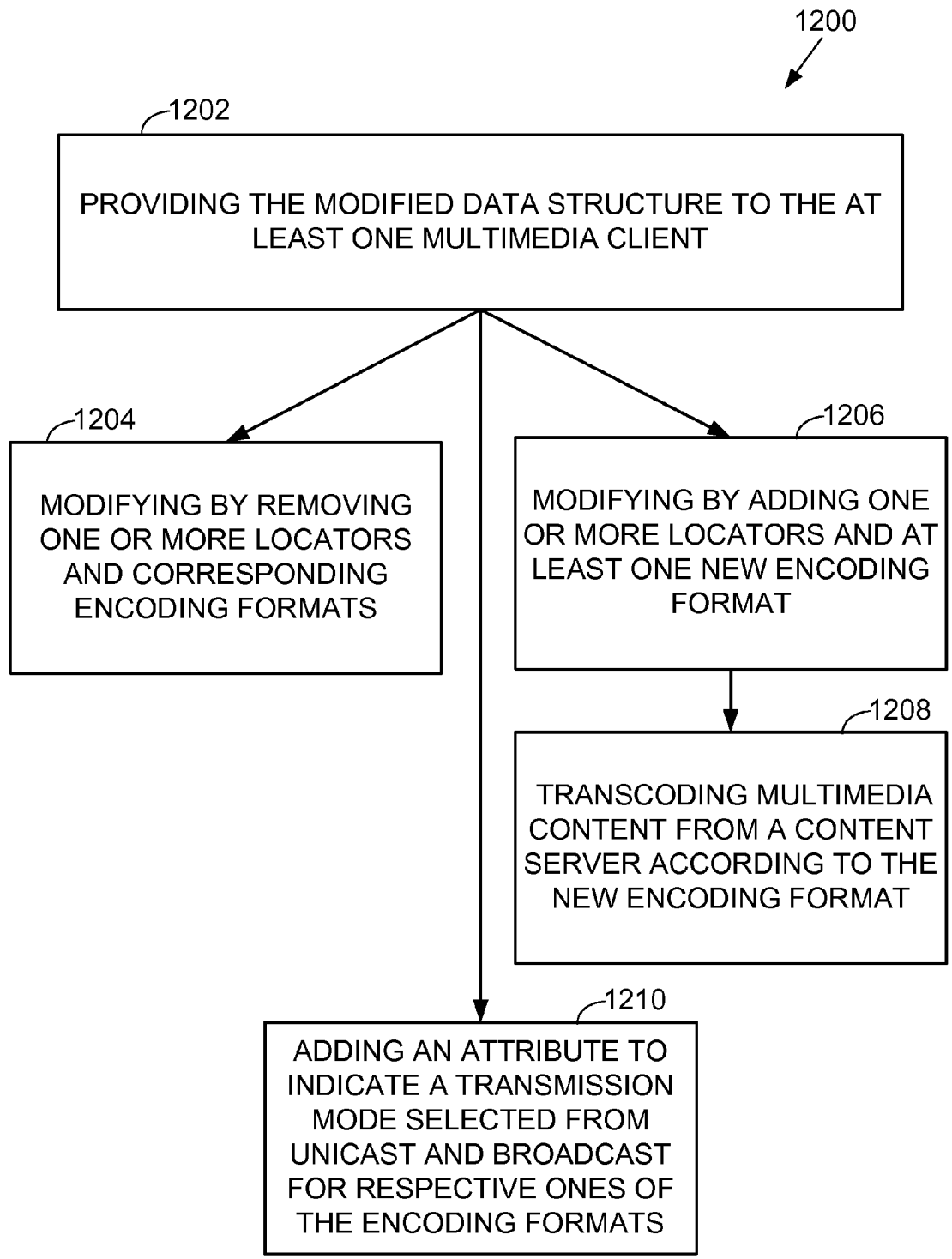
Figure 13:
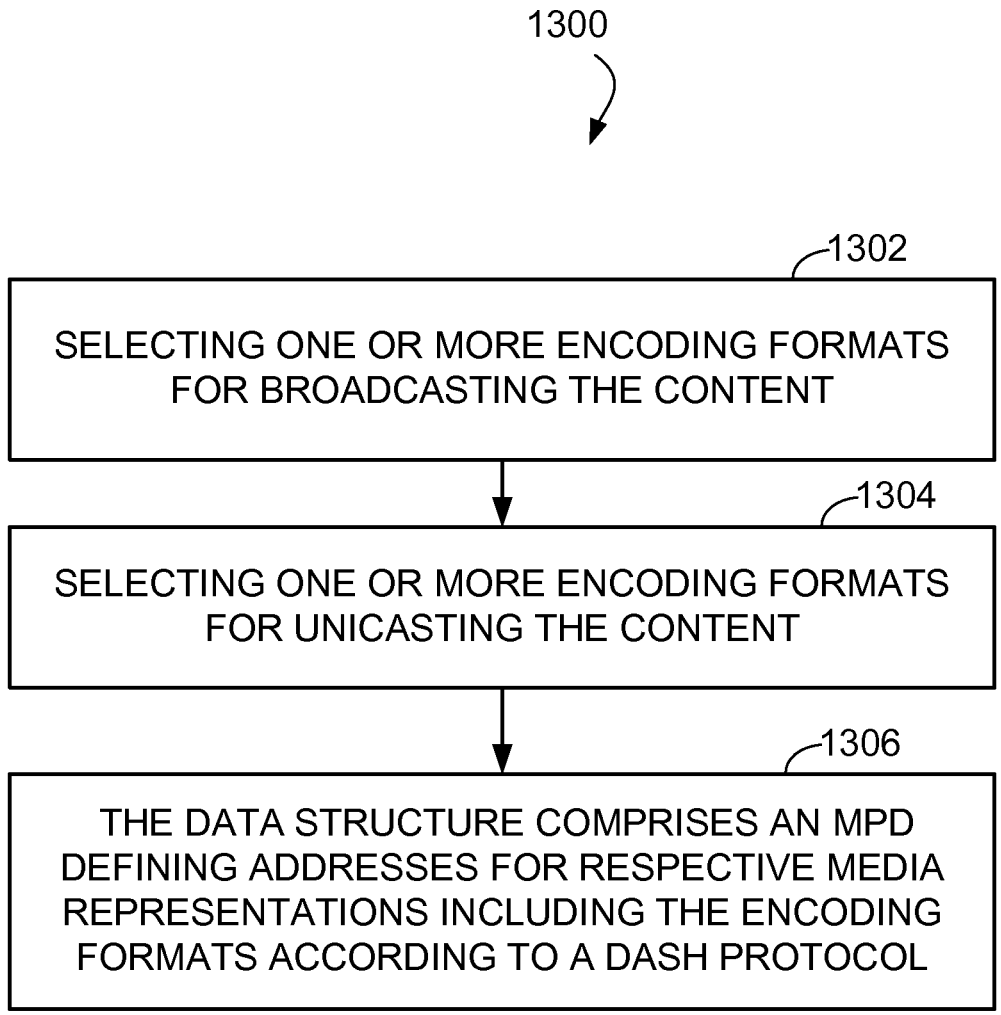
Figure 14:
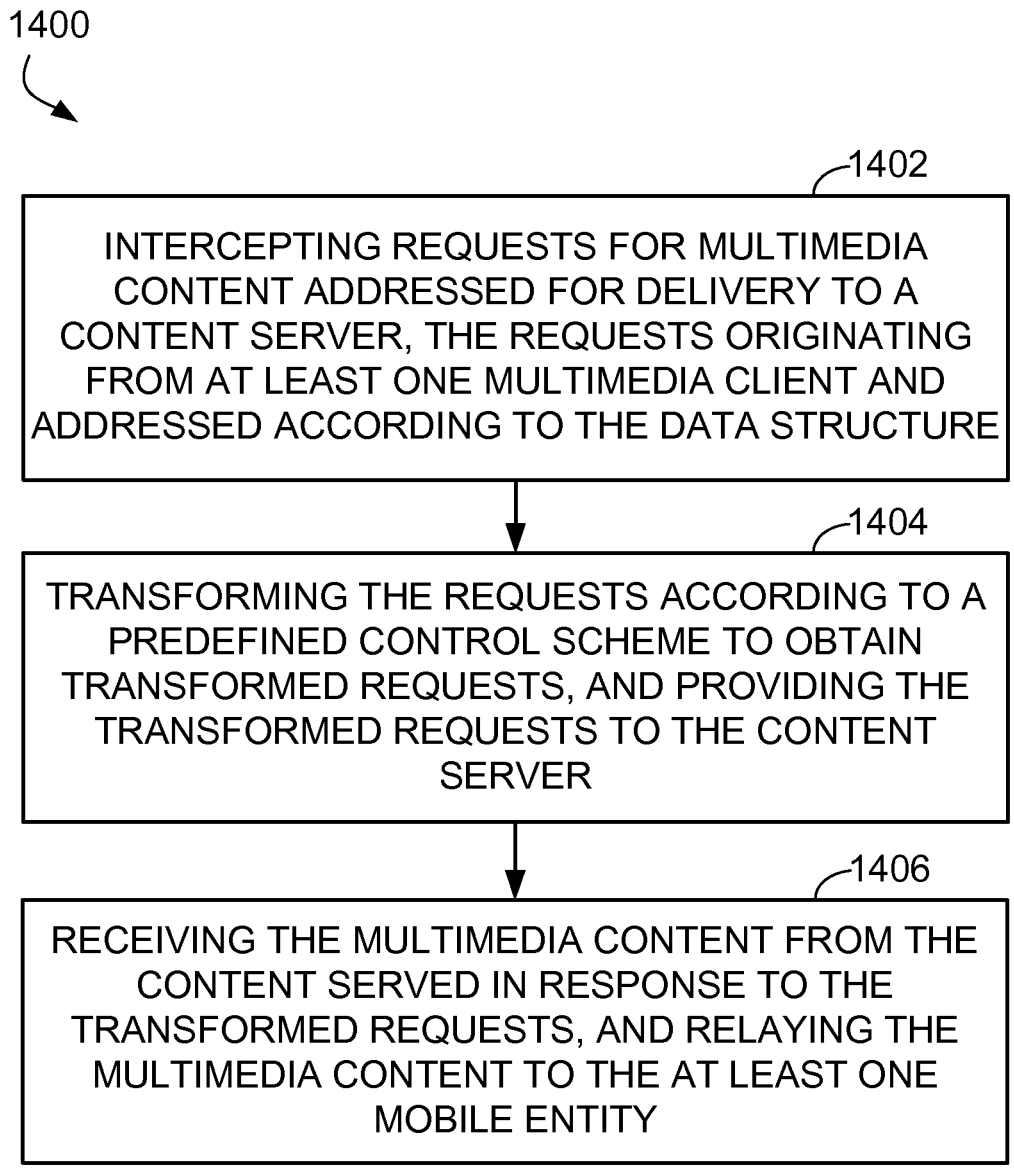

Additional operations 1200, 1300 and 1400 for controlling an encoding format, or related operations, are illustrated in FIGS. 12-14, for performance by the network entity/proxy component. One or more of operations 1200, 1300 and 1400 may optionally be performed as part of method 1100. The elements 1200, 1300 and 1400 may be performed in any operative order, or may be encompassed by a development algorithm without requiring a particular chronological order of performance. Operations are independently performed and not mutually exclusive. Therefore any one of such operations may be performed regardless of whether another downstream or upstream operation is performed. For example, if the method 1100 includes at least one of the operations 1200, then the method 1100 may terminate after the at least one operation, without necessarily having to include any subsequent downstream operation(s) that may be illustrated.

Referring to FIG. 12, the additional operations 1200 may include, at 1202, providing the modified data structure to the at least one multimedia client. In an aspect indicated at 1204, the proxy component may modify the data structure by removing one or more locators and corresponding encoding formats. This may be described as filtering records from the MPD, IS, or other data structure so as to remove records that are not pertinent to a network or service area, or that cannot be serviced at a particular time. For example, the proxy component may filter out addresses and representations that require higher network bandwidth than can be reliably supported by the network.

In the alternative, or in addition, the additional operations 1200 may include, at 1206, modifying the data structure by adding one or more locators and corresponding encoding formats, for example, as described above with reference to FIG. 9C. For example, at 1206, the proxy component may add one or more locators and an indication for a data format or transmission rate that is not otherwise supported or available from the content server. This may include, for example, transforming an MPD received from a DASH content server to include representations corresponding to operator-selected video resolution, unicast data rates as well as broadcast data rates, or a representation corresponding to a broadcast data rate only. Subsequently, at 1208, the method may include transcoding the multimedia content from the content server according to the data format and new encoding format. Note that the content server may not be controlled by the network operator. Accordingly, the content server may not provide a data format having a data rate desired by the network operator. Therefore the operator may provide the content in the desired format, for unicast or multicast, using the operations 1206 and 1208.

In another alternative, or in addition, the additional operations 1200 may include, at 1210, adding an attribute to indicate a transmission mode selected from unicast and broadcast for respective ones of the encoding formats. In an aspect, this may enable the proxy component to provide a data structure that combines information for adaptive streaming (e.g., an MPD) with information for broadcast services (e.g., a service guide). Thus, a client may efficiently access information for content delivered via both unicast transmission and broadcast transmission from a combined data structure.

Referring to FIG. 13, the additional operations 1300 may include, at 1302, selecting one or more encoding formats for a multimedia broadcast multicast transmission. The encoding format may or may not be for a data rate supported by the content server. If the data rate is not supported by the content server, the proxy component may transcode multimedia content from the content server into a format having the desired data rate or resolution for broadcast, and provide to another entity for broadcast in one or more broadcast areas including, for example, MBSFN areas. The additional operations 1300 may further include, at 1304, selecting one or more encoding formats for delivery of content via unicast transmission. An encoding format may relate to formats as indicated by an MPD or similar data structures for adaptive streaming. For example, the additional operations 1300 may include, at 1306, selecting the encoding format for the data structure, wherein the data structure comprises an MPD defining addresses for respective media representations including the encoding formats, according to a DASH protocol. The additional operations 1300 may further include the proxy component transmitting the multimedia content from the proxy component via DASH segments to the at least one multimedia client, without receiving an explicit request for the DASH segments from the at least one multimedia client. In addition, the proxy component may indicate the one or more locators to the at least one multimedia client, using corresponding URLs inserted in a File Description Table (FDT) of a FLUTE object.

Referring to FIG. 14, the additional operations 1400 may include, at 1402, intercepting requests for multimedia content addressed for delivery to a content server, the requests originating from at least one multimedia client and addressed according to the data structure. The requests may be (or may include) HTTP requests. The requests may be selectively redirected to the proxy component by another network component, for example, by an HDM. At times when not redirected, the multimedia client requests may be received by the content server and not by the proxy component. The method 1400 may further include, at 1404, transforming the requests according to a predefined control scheme to obtain transformed requests, and providing the transformed requests to the content server. Transforming may include transcoding, trans-formatting, or both; and may include decoding and re-encoding operations. The transformed requests may be modified to request the multimedia content from the content server in a format supported by the network. At 1406, the method may include the proxy component receiving the multimedia content from the content server in response to the transformed requests, and relaying the multimedia content to the at least one multimedia client, for example via a unicast adaptive streaming segment. In the alternative, the proxy component may be excluded from receiving the multimedia content in any format, which may be provided from the content server to the multimedia client via one or more other network entities.

In a further alternative, the proxy component may provide the transformed content to a network component for broadcast in a defined area, for example, in an MBSFN area or service area. According to this alternative, the proxy component may serve as a one-to-many server of the broadcast content for multiple clients, without intercepting requests for streaming segments. Instead, the proxy component may intercept or otherwise receive a request for a service guide, and generate a service guide for broadcast or multicast service in response to one or more such requests. The proxy component may generate the service guide using information from a content server regarding available encoding formats for requested data, event data such as a time for initiating a broadcast of particular content, and current or anticipated network conditions. The proxy component may provide the service guide to clients requesting it.

Figure 15A:
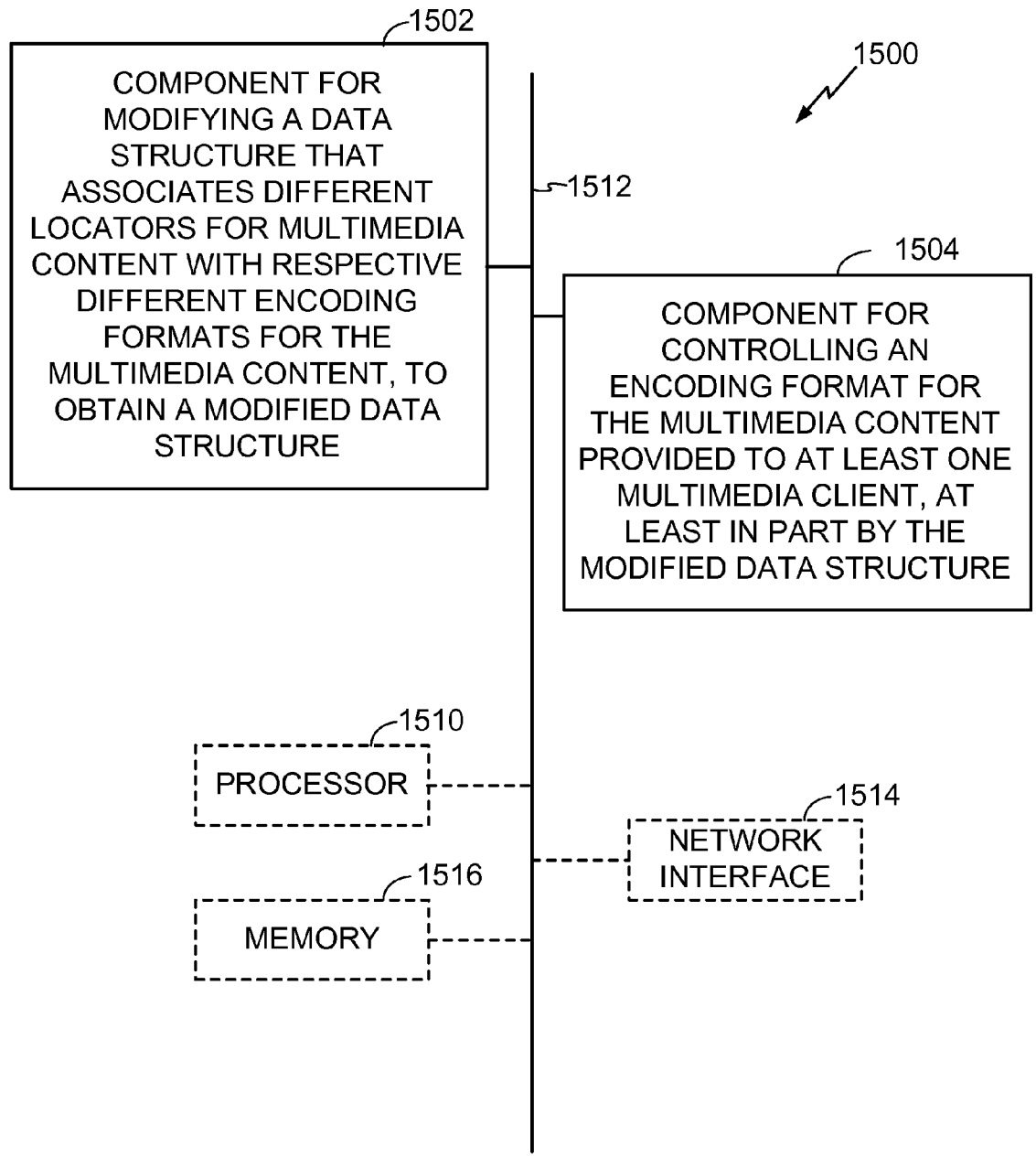
FIGS. 15A-D illustrate examples of an apparatus for implementing the methodologies of FIGS. 11-14.

With reference to FIG. 15A, there is provided an exemplary apparatus 1500 that may be configured as a BM-SC in a wireless network, or as a processor, component or similar device for use within the BM-SC, for controlling encoding formats used in unicast or broadcast services from content providers. The apparatus 1500 may include functional blocks that can represent functions implemented by a processor, software, or combination thereof (e.g., firmware).

As illustrated, in one embodiment, the apparatus 1500 may include an electrical component or module 1502 for modifying a data structure that associates different locators for multimedia content with respective different encoding formats for the multimedia content, to obtain a modified data structure. For example, the electrical component or module 1502 may include at least one control processor coupled to a network interface (e.g., transmitter, receiver, transceiver), or the like and to a memory with instructions for modifying an MPD or service guide. The apparatus 1500 may include an electrical component or module 1504 for controlling an encoding format for the multimedia content provided to at least one multimedia client, at least in part by the modifying operation of component 1502. For example, the electrical component or module 1504 may include at least one control processor coupled to a memory holding instructions for presenting a client (i.e., multimedia client) interface to the content server, presenting a content server interface to the multimedia client, receiving and transmitting signals through those interfaces, and controlling the encoding format using the described modification of the data structure. The data structure may be, or may include, for example, a DASH MPD representation or service guide for a broadcast. The apparatus 1500 may include similar electrical components or modules for performing any or all of the additional operations 1200, 1300 and 1400 described in connection with FIGS. 12-14, which for illustrative simplicity are not shown in FIG. 15A.

In related aspects, the apparatus 1500 may optionally include a processor component 1510 having at least one processor, in the case of the apparatus 1500 configured as a network entity. The processor 1510, in such case, may be in operative communication with the components 1502-1504 or similar components via a bus 1512 or similar communication coupling. The processor 1510 may effect initiation and scheduling of the processes or functions performed by electrical components or modules 1502-1504.

In further related aspects, the apparatus 1500 may include a network interface component 1514 for communicating with other network entities. The apparatus 1500 may optionally include a component for storing information, such as, for example, a memory device/component 1516. The computer readable medium or the memory component 1516 may be operatively coupled to the other components of the apparatus 1500 via the bus 1512 or the like. The memory component 1516 may be adapted to store computer readable instructions and data for performing the activity of the components 1502-1504, and subcomponents thereof, or the processor 1510, the additional operations 1200, 1300 and 1400, or the methods disclosed herein. The memory component 1516 may retain instructions for executing functions associated with the components 1502-1504. While shown as being external to the memory 1516, it is to be understood that the components 1502-1504 can exist within the memory 1516.

Figure 15B:
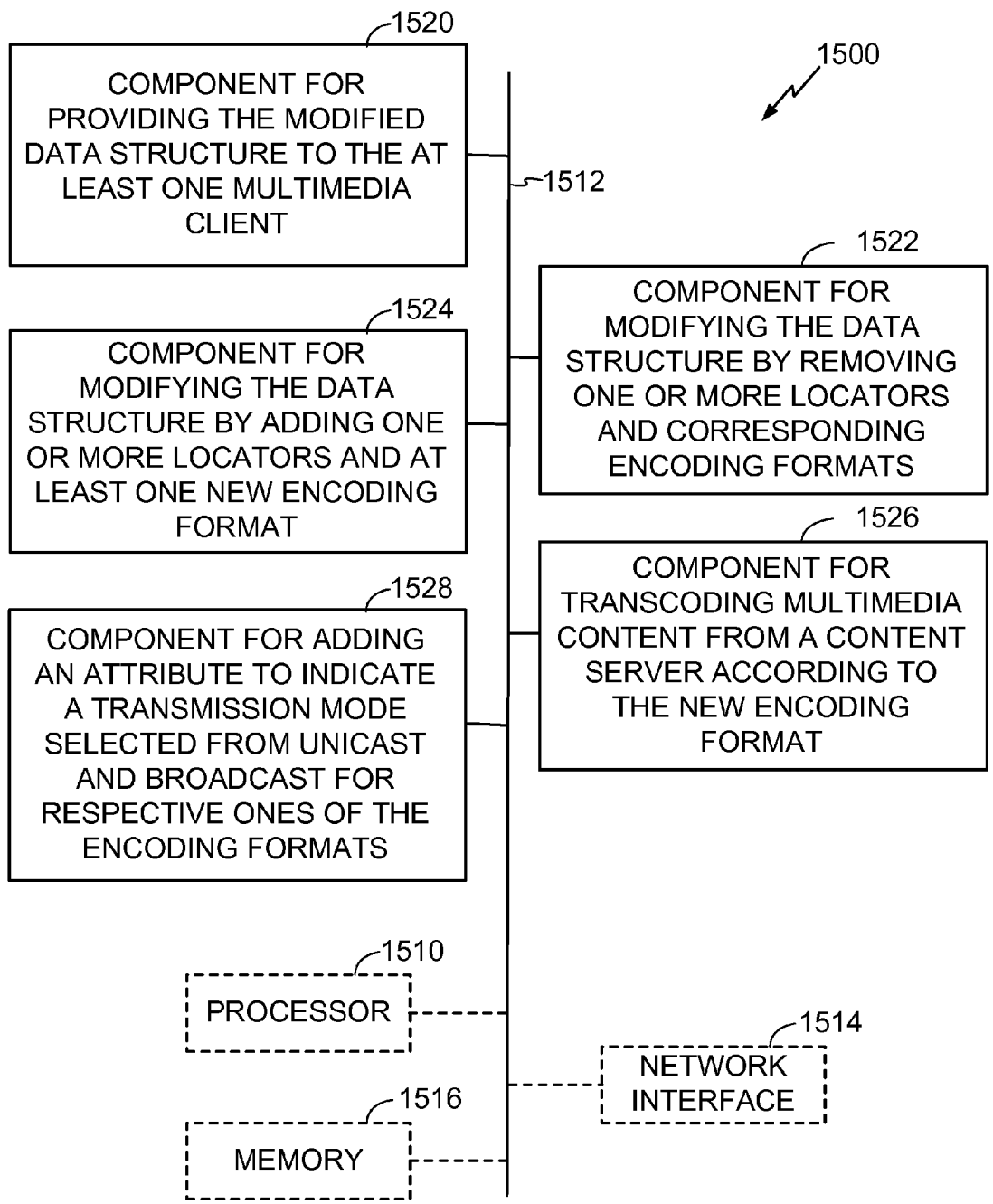

With reference to FIG. 15B, there are shown further optional components or modules of the apparatus 1500. For example, the apparatus 1500 may further include an electrical component or module 1520 for providing the modified data structure to the at least one multimedia client. The electrical component or module 1520 may be the network interface 1514, or the network interface 1514 coupled to the processor 1510 and/or memory 1516. For example, the apparatus 1500 may further include an electrical component or module 1522 for modifying the data structure by removing one or more locators and corresponding encoding formats. The apparatus 1500 may further include an electrical component or module 1524 for modifying the data structure by adding one or more locators and at least one new encoding format. The apparatus 1500 may further include an electrical component or module 1526 for transcoding multimedia content from a content server according to the new encoding format. The apparatus 1500 may further include an electrical component or module 1528 for adding an attribute to indicate a transmission mode selected from unicast and broadcast for respective ones of the encoding formats.

Figure 15C:
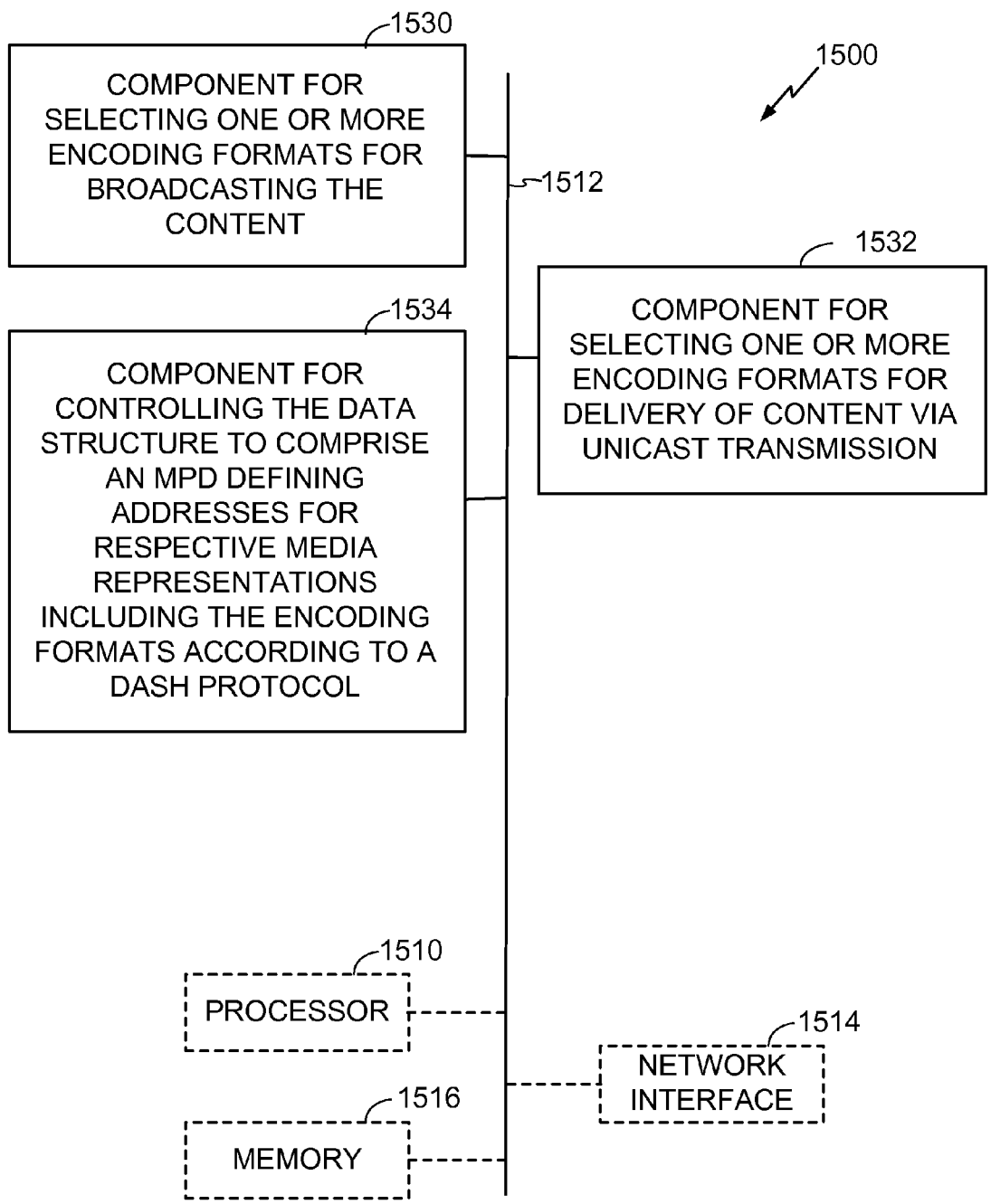

With reference to FIG. 15C, there are shown further optional components or modules of the apparatus 1500. For example, the apparatus 1500 may further include an electrical component or module 1530 for selecting one or more encoding formats for broadcasting the content. For example, the apparatus 1500 may further include an electrical component or module 1532 for selecting one or more encoding formats for delivery of content via unicast transmission. The apparatus 1500 may further include an electrical component or module 1534 for controlling the data structure to comprise an MPD defining addresses for respective media representations including the encoding formats according to a DASH protocol.

Figure 15D:
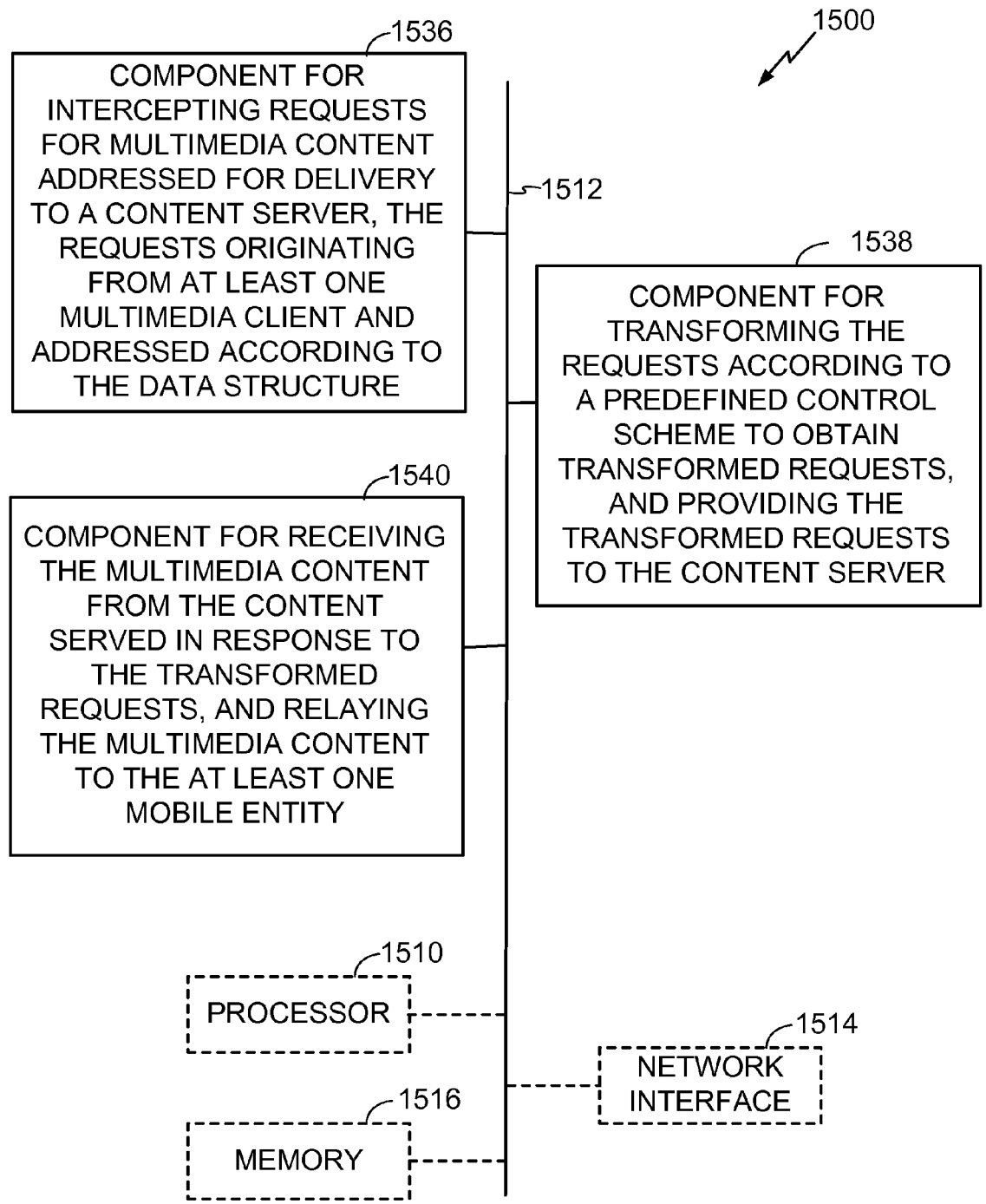

With reference to FIG. 15D, there are shown further optional components or modules of the apparatus 1500. For example, the apparatus 1500 may further include an electrical component or module 1536 for intercepting requests for multimedia content addressed for delivery to a content server, the requests originating from at least one multimedia client and addressed according to the data structure. The electrical component or module 1536 may be the network interface 1514, or the network interface 1514 coupled to the processor 1510 and/or memory 1516. For example, the apparatus 1500 may further include an electrical component or module 1538 for transforming the requests according to a predefined control scheme to obtain transformed requests, and providing the transformed requests to the content server. The apparatus 1500 may further include an electrical component or module 1540 for receiving the multimedia content from the content served in response to the transformed requests, and relaying the multimedia content to the at least one mobile entity. The electrical component or module 1540 may be the network interface 1514, or the network interface 1514 coupled to the processor 1510 and/or memory 1516.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection may be properly termed a computer-readable medium to the extent involving non-transient storage of transmitted signals. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium, to the extent the signal is retained in the transmission chain on a storage medium or device memory for any non-transient length of time. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for controlling an encoding format of multimedia content for a multimedia client of a wireless communications network (WCN), the method comprising:
    modifying, at a proxy component of a WCN network entity, a data structure controlled by an entity residing outside of the WCN comprising different locators for representations of a multimedia content available for transport by the WCN, wherein the representations are associated with respective different encoding formats, to obtain a modified data structure based on compatibility with a service level supported by the WCN; and
    controlling an encoding format for the multimedia content provided to at least one multimedia client, at least in part by the modified data structure.

2. The method of claim 1, further comprising providing the modified data structure to the at least one multimedia client.

3. The method of claim 1, wherein modifying the data structure comprises removing one or more of the different locators and corresponding ones of the different encoding formats.

4. The method of claim 1, wherein modifying the data structure comprises adding one or more additional locators and at least one new encoding format.

5. The method of claim 4, wherein the encoding format comprises at least one of MPEG2, MPEG4, H.264, or H.265, and the at least one new encoding format comprises at least one of MPEG2, MPEG4, H.264, or H.265.

6. The method of claim 5, further comprising transcoding multimedia content from a content server according to the least one new encoding format.

7. The method of claim 1, wherein modifying the data structure comprises adding an attribute to indicate one of a unicast or broadcast transmission mode for respective ones of the different encoding formats.

8. The method of claim 1, wherein controlling the encoding format further comprises selecting one or more encoding formats for broadcasting the multimedia content.

9. The method of claim 1, wherein the data structure comprises a Media Presentation Description (MPD) defining addresses for respective media representations including encoding formats according to a Dynamic Adaptive Streaming over Hypertext Transport Protocol (HTTP) (DASH) protocol.

10. The method of claim 9, further comprising transmitting the multimedia content from the proxy component in DASH segments to the at least one multimedia client, without receiving an explicit request for the DASH segments from the at least one multimedia client.

11. The method of claim 10, further comprising the proxy component indicating the different locators to the at least one multimedia client using corresponding Uniform Resource Locators (URLs) inserted in a File Description Table (FDT) of a File Delivery Over Unidirectional Transport (FLUTE) object.

12. The method of claim 1, further comprising intercepting requests for multimedia content addressed for delivery to a content server, the requests originating from at least one multimedia client and addressed according to the data structure.

13. The method of claim 12, wherein controlling the encoding format further comprises transforming the requests according to a predefined control scheme to obtain transformed requests, and providing the transformed requests to the content server.

14. The method of claim 13, further comprising receiving the multimedia content from the content server in response to the transformed requests, and relaying the multimedia content to the at least one multimedia client.

15. The method of claim 1, wherein the proxy component comprises a DASH proxy entity and the WCN network entity comprises a broadcast multicast service center (BM-SC).

16. A system for controlling an encoding format of multimedia content provided to a multimedia client of a wireless communications network (WCN), the system comprising:
    means for modifying, at a proxy component of the WCN network entity, a data structure received from a content server comprising different locators for representations of a multimedia content available for transport by the WCN, wherein the representations are associated with respective different encoding formats, to obtain a modified data structure based on compatibility with a service level supported by the WCN, thereby controlling an encoding format for the multimedia content provided to at least one multimedia client.

17. The system of claim 16, further comprising means for providing the modified data structure to the at least one multimedia client.

18. The system of claim 16, wherein modifying the data structure comprises removing one or more of the different locators and corresponding ones of the different encoding formats.

19. The system of claim 16, wherein modifying the data structure comprises adding one or more additional locators and at least one new encoding format.

20. The system of claim 19, further comprising means for transcoding multimedia content from the content server according to the least one new encoding format.

21. The system of claim 16, wherein modifying the data structure comprises adding an attribute to indicate one of a unicast or broadcast transmission mode for respective ones of the different encoding formats.

22. The system of claim 16, wherein controlling the encoding format further comprises selecting one or more encoding formats for broadcasting the multimedia content.

23. The system of claim 16, wherein the data structure comprises a Media Presentation Description (MPD) defining addresses for respective media representations including encoding formats according to a Dynamic Adaptive Streaming over Hypertext Transport Protocol (HTTP) (DASH) protocol.

24. The system of claim 23, further comprising means for transmitting the multimedia content from the proxy component in DASH segments to the at least one multimedia client, without receiving an explicit request for the DASH segments from the at least one multimedia client.

25. The system of claim 24, further comprising means for indicating, at the proxy component, the different locators to the at least one multimedia client using corresponding Uniform Resource Locators (URLs) inserted in a File Description Table (FDT) of a File Delivery Over Unidirectional Transport (FLUTE) object.

26. The system of claim 16, further comprising means for intercepting requests for multimedia content addressed for delivery to the content server, the requests originating from at least one multimedia client and addressed according to the data structure.

27. The system of claim 26, wherein controlling the encoding format further comprises transforming the requests according to a predefined control scheme to obtain transformed requests, and providing the transformed requests to the content server.

28. The system of claim 27, further comprising means for receiving the multimedia content from the content server in response to the transformed requests, and means for relaying the multimedia content to the at least one multimedia client.

29. The system of claim 16, wherein the proxy component comprises a DASH proxy component and the WCN network entity comprises a broadcast multicast service center (BM-SC).

30. A system for controlling an encoding format of multimedia content provided to a multimedia client of a wireless communications network (WCN), comprising:
    at least one processor configured for modifying a data structure received from a content server comprising different locators for representations of a multimedia content available for transport by the WCN, wherein the representations are associated with respective different encoding formats, to obtain a modified data structure based on compatibility with a service level supported by the WCN, and operating as a proxy component of a WCN network entity between the at least one multimedia client and the content server to control an encoding format for the multimedia content provided to at least one multimedia client; and
    a memory coupled to the at least one processor for storing data.

31. The system of claim 30, wherein the at least one processor is further configured for providing the modified data structure to the at least one multimedia client.

32. The system of claim 30, wherein modifying the data structure comprises removing one or more of the different locators and corresponding ones of the different encoding formats.

33. The system of claim 30, wherein modifying the data structure comprises adding one or more additional locators and at least one new encoding format.

34. The system of claim 33, wherein the at least one processor is further configured for transcoding multimedia content from a content server according to the least one new encoding format.

35. The system of claim 30, wherein modifying the data structure comprises adding an attribute to indicate one of a unicast or broadcast transmission mode for respective ones of the different encoding formats.

36. The system of claim 30, wherein controlling the encoding format further comprises selecting one or more encoding formats for broadcasting the multimedia content.

37. The system of claim 30, wherein the data structure comprises a Media Presentation Description (MPD) defining addresses for respective media representations including encoding formats according to a Dynamic Adaptive Streaming over Hypertext Transport Protocol (HTTP) (DASH) protocol.

38. The system of claim 37, wherein the at least one processor is further configured for transmitting the multimedia content from the proxy component in DASH segments to the at least one multimedia client, without receiving an explicit request for the DASH segments from the at least one multimedia client.

39. The system of claim 38, wherein the at least one processor is further configured for indicating the different locators to the at least one multimedia client using corresponding Uniform Resource Locators (URLs) inserted in a File Description Table (FDT) of a File Delivery Over Unidirectional Transport (FLUTE) object.

40. The system of claim 30, wherein the at least one processor is further configured for intercepting requests for multimedia content addressed for delivery to a content server, the requests originating from at least one multimedia client and addressed according to the data structure.

41. The system of claim 40, wherein controlling the encoding format further comprises transforming the requests according to a predefined control scheme to obtain transformed requests, and providing the transformed requests to the content server.

42. The system of claim 41, wherein the at least one processor is further configured for receiving the multimedia content from the content server in response to the transformed requests, and means for relaying the multimedia content to the at least one multimedia client.

43. The system of claim 30, wherein the proxy component comprises a DASH proxy entity and the WCN network entity comprises a broadcast multicast service center (BM-SC).

44. A non-transitory computer-readable medium comprising code for modifying a data structure received from a content server comprising different locators for representations of a multimedia content available for transport by the WCN, wherein the representations are associated with respective different encoding formats, to obtain a modified data structure based on compatibility with a service level supported by the WCN, and operating as a proxy component of a WCN network entity between the at least one multimedia client and the content server to control an encoding format for the multimedia content provided to at least one multimedia client.

45. The non-transitory computer-readable medium of claim 44, wherein the at least one processor is further configured for providing the modified data structure to the at least one multimedia client.

46. The non-transitory computer-readable medium of claim 44, wherein modifying the data structure comprises removing one or more of the different locators and corresponding ones of the different encoding formats.

47. The non-transitory computer-readable medium of claim 44, wherein modifying the data structure comprises adding one or more additional locators and at least one new encoding format.

48. The non-transitory computer-readable medium of claim 47, wherein the at least one processor is further configured for transcoding multimedia content from a content server according to the least one new encoding format.

49. The non-transitory computer-readable medium of claim 44, wherein modifying the data structure comprises adding an attribute to indicate one of a unicast or broadcast transmission mode for respective ones of the different encoding formats.

50. The non-transitory computer-readable medium of claim 44, wherein controlling the encoding format further comprises selecting one or more encoding formats for broadcasting the multimedia content.

51. The non-transitory computer-readable medium of claim 44, wherein the data structure comprises a Media Presentation Description (MPD) defining addresses for respective media representations including encoding formats according to a Dynamic Adaptive Streaming over Hypertext Transport Protocol (HTTP) (DASH) protocol.

52. The non-transitory computer-readable medium of claim 51, wherein the at least one processor is further configured for transmitting the multimedia content from the proxy component in DASH segments to the at least one multimedia client, without receiving an explicit request for the DASH segments from the at least one multimedia client.

53. The non-transitory computer-readable medium of claim 52, wherein the at least one processor is further configured for indicating the different locators to the at least one multimedia client using corresponding Uniform Resource Locators (URLs) inserted in a File Description Table (FDT) of a File Delivery Over Unidirectional Transport (FLUTE) object.

54. The non-transitory computer-readable medium of claim 44, wherein the at least one processor is further configured for intercepting requests for multimedia content addressed for delivery to a content server, the requests originating from at least one multimedia client and addressed according to the data structure.

55. The non-transitory computer-readable medium of claim 54, wherein controlling the encoding format further comprises transforming the requests according to a predefined control scheme to obtain transformed requests, and providing the transformed requests to the content server.

56. The non-transitory computer-readable medium of claim 55, wherein the at least one processor is further configured for receiving the multimedia content from the content server in response to the transformed requests, and means for relaying the multimedia content to the at least one multimedia client.

57. The non-transitory computer-readable medium of claim 44, wherein the proxy component comprises a DASH proxy entity and the WCN network entity comprises a broadcast multicast service center (BM-SC).

\* \* \* \* \*